(12) United States Patent
Arumugam et al.

(10) Patent No.: US 10,204,476 B2
(45) Date of Patent: *Feb. 12, 2019

(54) SYSTEM AND METHOD FOR AUGMENTED REALITY USING A USER-SPECIFIC OBJECT

(71) Applicant: Bally Gaming, Inc., Las Vegas, NV (US)

(72) Inventors: Murugeshun Arun Arumugam, Chennai (IN); Martin S. Lyons, Henderson, NV (US); Bryan M. Kelly, Alamo, CA (US); John Sommer, Las Vegas, NV (US)

(73) Assignee: Bally Gaming, Inc., Las Vegas, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/850,594

(22) Filed: Dec. 21, 2017

(65) Prior Publication Data

US 2018/0114401 A1 Apr. 26, 2018

Related U.S. Application Data

(63) Continuation of application No. 15/603,185, filed on May 23, 2017, now Pat. No. 9,875,600, which is a
(Continued)

(51) Int. Cl.
 *G07F 17/32* (2006.01)
 *G06F 3/0481* (2013.01)

(52) U.S. Cl.
 CPC ...... *G07F 17/3211* (2013.01); *G06F 3/04815* (2013.01); *G07F 17/323* (2013.01);
(Continued)

(58) Field of Classification Search
 CPC .... G07F 17/32; G07F 17/323; G07F 17/3239; G07F 17/3255
 See application file for complete search history.

(56) References Cited

U.S. PATENT DOCUMENTS 6,001,016 A 12/1999 Walker et al.
6,361,437 B1 3/2002 Walker et al.
(Continued)

FOREIGN PATENT DOCUMENTS

WO 2010/128329 A2 11/2010

OTHER PUBLICATIONS

Staled, "Augmented reality poker app," Sep. 24, 2009, URL=projectpalace.blogspot.com/2009/09/augmented-reality-poker-app.html, download date Oct. 11, 2012, 2 pages.

*Primary Examiner* — Omkar Deodhar
*Assistant Examiner* — Shauna-Kay Hall
(74) *Attorney, Agent, or Firm* — Seed Intellectual Property Law Group LLP

(57) ABSTRACT

Disclosed is a method of displaying augmented reality gaming information associated with a user-specific object using mobile device in an augmented reality gaming system. In one embodiment, the method includes: enabling a user to view a live image of a user-specific object through a display of a mobile device; acquiring user-specific identification information from the user-specific object; sending the user-specific identification information via a network to a server; retrieving user-specific specific information from the server using the mobile device; and displaying the user-specific information in conjunction with the user-specific object when viewing the user-specific object through the display of the mobile device using augmented reality.

19 Claims, 33 Drawing Sheets

Related U.S. Application Data continuation of application No. 14/828,414, filed on Aug. 17, 2015, now Pat. No. 9,697,676, which is a continuation of application No. 13/842,385, filed on Mar. 15, 2013, now Pat. No. 9,111,418, which is a continuation-in-part of application No. 12/969,462, filed on Dec. 15, 2010, now Pat. No. 8,821,274.

(52) U.S. Cl.
CPC ...... *G07F 17/3209* (2013.01); *G07F 17/3218* (2013.01); *G07F 17/3237* (2013.01); *G07F 17/3239* (2013.01); *G07F 17/3244* (2013.01); *G07F 17/3255* (2013.01)

(56) References Cited

U.S. PATENT DOCUMENTS

| | | |
|---|---|---|
| 6,969,317 B2 | 11/2005 | Walker et al. |
| 7,066,815 B2 | 6/2006 | Walker et al. |
| 7,588,495 B2 | 9/2009 | Walker et al. |
| 8,226,011 B2 | 7/2012 | Merkli et al. |
| 8,547,401 B2 | 10/2013 | Mallinson et al. |
| 2002/0010025 A1 | 1/2002 | Kelly et al. |
| 2004/0229684 A1 | 11/2004 | Blackburn et al. |
| 2006/0232662 A1 | 10/2006 | Otaka et al. |
| 2007/0087829 A1 | 4/2007 | Liu et al. |
| 2007/0213124 A1 | 9/2007 | Walker et al. |
| 2008/0026822 A1 | 1/2008 | Walker et al. |
| 2008/0064467 A1 | 3/2008 | Reiner |
| 2008/0102934 A1 | 5/2008 | Tan |
| 2008/0189360 A1 | 8/2008 | Kiley et al. |
| 2009/0017913 A1 | 1/2009 | Bell et al. |
| 2009/0088243 A1 | 4/2009 | Gagner et al. |
| 2009/0117989 A1 | 5/2009 | Arezina et al. |
| 2009/0209320 A1 | 8/2009 | Walker et al. |
| 2009/0264189 A1 | 10/2009 | Lutnick et al. |
| 2009/0286584 A1 | 11/2009 | Muskin |
| 2010/0197410 A1 | 8/2010 | Leen et al. |
| 2010/0287500 A1 | 11/2010 | Whitlow et al. |
| 2011/0055049 A1 | 3/2011 | Harper et al. |
| 2011/0060669 A1 | 3/2011 | Laves |
| 2011/0065496 A1 | 3/2011 | Gagner et al. |
| 2011/0138416 A1 | 6/2011 | Kang et al. |
| 2011/0151955 A1 | 6/2011 | Nave |
| 2011/0153362 A1 | 6/2011 | Valin et al. |
| 2011/0183749 A1 | 7/2011 | Allen et al. |
| 2011/0207531 A1 | 8/2011 | Gagner et al. |
| 2011/0212766 A1 | 9/2011 | Bowers et al. |
| 2012/0021814 A1 | 1/2012 | Gurovich et al. |
| 2012/0105487 A1 | 5/2012 | Son et al. |
| 2012/0184352 A1 | 7/2012 | Detlefsen et al. |

SYSTEM AND METHOD FOR AUGMENTED REALITY USING A USER-SPECIFIC OBJECT

CROSS-REFERENCE TO RELATED APPLICATIONS

This application is a Continuation of U.S. patent application Ser. No. 15/603,185, filed May 23, 2017, which is a Continuation of U.S. patent application Ser. No. 14/828,414, filed Aug. 17, 2015, which is a Continuation of U.S. patent application Ser. No. 13/842,385, filed Mar. 15, 2013, now U.S. Pat. No. 9,111,418, which is a Continuation-In-Part of U.S. patent application Ser. No. 12/969,462, filed Dec. 15, 2010, now U.S. Pat. No. 8,821,274, all of which are incorporated herein by reference.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

TECHNICAL FIELD

This disclosure is directed to wagering games, gaming machines, networked gaming systems and methods, and in particular to the maintenance of these wagering games, gaming machines, networked gaming systems and methods.

BACKGROUND

Previously, various types of gaming machines have been developed with different features to captivate and maintain player interest. In general, a gaming machine allows a player to play a game in exchange for a wager. Depending on the outcome of the game, the player may be entitled to an award which is paid to the player by the gaming machine, normally in the form of currency or game credits. Gaming machines may include flashing displays, lighted displays, or sound effects to capture a player's interest in a gaming device.

Another important feature of maintaining player interest in a gaming machine includes providing the player with many opportunities to win awards, such as cash or prizes. For example, in some slot machines, the display windows show more than one adjacent symbol on each reel, thereby allowing for multiple-line betting.

In the past, manufacturers have developed systems for control of gaming machines. Specifically, these have included applications for denying self-excluded gamblers from playing slot machines, bonusing of anonymous players and allowing a player to participate in a casino loyalty scheme without the need to insert a physical card into the gaming machine.

While gaming machines including feature games have been successful, there remains a need for feature games that provide players with enhanced excitement and an increased opportunity of winning.

SUMMARY

Briefly, and in general terms, the method is disclosed of displaying augmented reality gaming information associated with a user-specific object using mobile device in an augmented reality gaming system. In one embodiment, the method includes: enabling a user to view a live image of a user-specific object through a display of a mobile device; acquiring user-specific identification information from the user-specific object; sending the user-specific identification information via a network to a server; retrieving user-specific information from the server using the mobile device; and displaying the user-specific information in conjunction with the user-specific object when viewing the user-specific object through the display of the mobile device using augmented reality.

In some embodiments, the user-specific information includes messages to the user, available credits, and promotional points available to the user. In one aspect, the user-specific information is displayed using one or more icons presented in association with the user-specific object when viewed through the display of the mobile device. In one embodiment, different icons are displayed depending on the user-specific information associated with the user. The user-specific identification information may be acquired from the user-specific object using a QR code. The user-specific identification information also may be acquired from the user-specific object using optical character recognition of information visible on the user-specific object. Continuing, some embodiments further comprise enabling the user to interact with the user-specific information in conjunction with the user-specific object when viewing the user-specific object through the display of a mobile device using augmented reality.

In another embodiment, another gaming method is disclosed of displaying augmented reality gaming information associated with a user-specific object using mobile device in an augmented reality gaming system. In one embodiment, the method includes: enabling a user to view a live image of a user-specific object through a display of a mobile device; acquiring user-specific identification information from the user-specific object; sending the user-specific identification information via a network to a server; retrieving promotional or voucher information from the server using the mobile device; and displaying the promotional or voucher information in conjunction with the user-specific object when viewing the user-specific object through the display of the mobile device using augmented reality. The promotional or voucher information may include a complementary drink icon, a movie ticket icon, a restaurant voucher icon, or combinations thereof.

Continuing, in another aspect of some embodiments, a gaming method is disclosed of displaying augmented reality gaming information associated with a user-specific object using mobile device in an augmented reality gaming system. In one embodiment, the method includes: enabling a user to view a live image of a user-specific object through a display of a mobile device; acquiring user-specific identification information from the user-specific object; sending the user-specific identification information via a network to a server; retrieving bonus game information from the server using the mobile device; and displaying the bonus game information in conjunction with the user-specific object when viewing the user-specific object through the display of the mobile device using augmented reality. The promotional or voucher information may include a virtual bonus game, a virtual promotional game, a virtual base game, or combinations thereof.

Features and advantages will become apparent from the following detailed description, taken in conjunction with the accompanying drawings, which illustrate by way of example, the features of the various embodiments.

DETAILED DESCRIPTION OF PREFERRED EMBODIMENTS

Figure 1A:
FIG. 1A illustrates a player card, shown with a player name, player ID number, and a QR code.

Various embodiments are directed to a game, gaming machine, gaming systems and method for playing a game, wherein the gaming system includes augmented reality that interacts with a player card. The embodiments are illustrated and described herein, by way of example only, and not by way of limitation. Referring now to the drawings, and more particularly to FIGS. 1-4, there are shown illustrative examples of games, gaming machines, gaming systems and methods for playing a game in accordance with various aspects of the gaming system which includes augmented reality that interacts with a player card.

Examples in accordance with one or more aspects of the augmented reality player card system 100 are shown in FIGS. 1-4. One embodiment of an augmented reality player card system 100 includes an augmented reality application that interacts with a player card 110. Such an embodiment may be employed in casinos where carded play is allowed, and a player is given a player card 110. This type of player card 110 typically contains information (e.g., an identification code) that is used for retrieving player information from the backend system. In the embodiments of the augmented reality player card system 100 described below, this Augmented Reality technology may be used to leverage this player card information in order to provide enhanced presentation of this information in an augmented reality construct along with additional features that leverage a virtual format.

These features of the augmented reality player card system 100 that are presented in a virtual format include, by way of example only, and not by way of limitation: (1) displaying player card information on an Augmented Reality display of a mobile device's camera; (2) displaying promotions available in the casino on an Augmented Reality display of a mobile device's camera; and (3) displaying bonus games which can be played using Augmented Reality technology on an Augmented Reality display of a mobile device's camera. In one embodiment of the augmented reality player card system 100, awards credits/points are added to the game when a player next uses the player card 110. These features may be enabled when the player sees his player card 110 through a camera in an Augmented Reality-equipped mobile device 120, such as a smart phone, tablet, or HUD (Heads Up Display) of a mobile device.

In one embodiment of an augmented reality player card system 100, applications are incorporated using Augmented Reality technology over a player card 110. Typically, an Augmented Reality-enabled mobile device 120 (or "Augmented Reality system") is equipped with Augmented Reality applications that may be used to leverage information on the player card 110.

In the augmented reality player card system 100, the Augmented Reality applications may be downloaded to the Augmented Reality mobile device 120 using an automatic approach or a manual approach. In the automatic approach, a patron's Augmented Reality-enabled mobile device 120 is identified by an ID system. The ID system prompts the Augmented Reality system for the patron's permission to download the Augmented Reality application. The actual download from the ID system to the Augmented Reality mobile device 120 may be performed through Wi-Fi, BlueTooth, or other wired/wireless communication mechanisms. In the automatic approach, the patron may download the Augmented Reality application at a kiosk. The Augmented Reality mobile device 120 may communicate with the kiosk through a wireless protocol (WiFi/BlueTooth) or a wired protocol. Patron can initiate the download of the application from the kiosk.

Figure 1B:
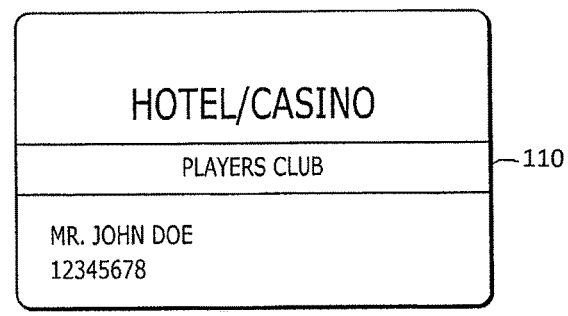
FIG. 1B illustrates a player card, shown with a player name and player ID number, but without a QR code.
Figure 2A:
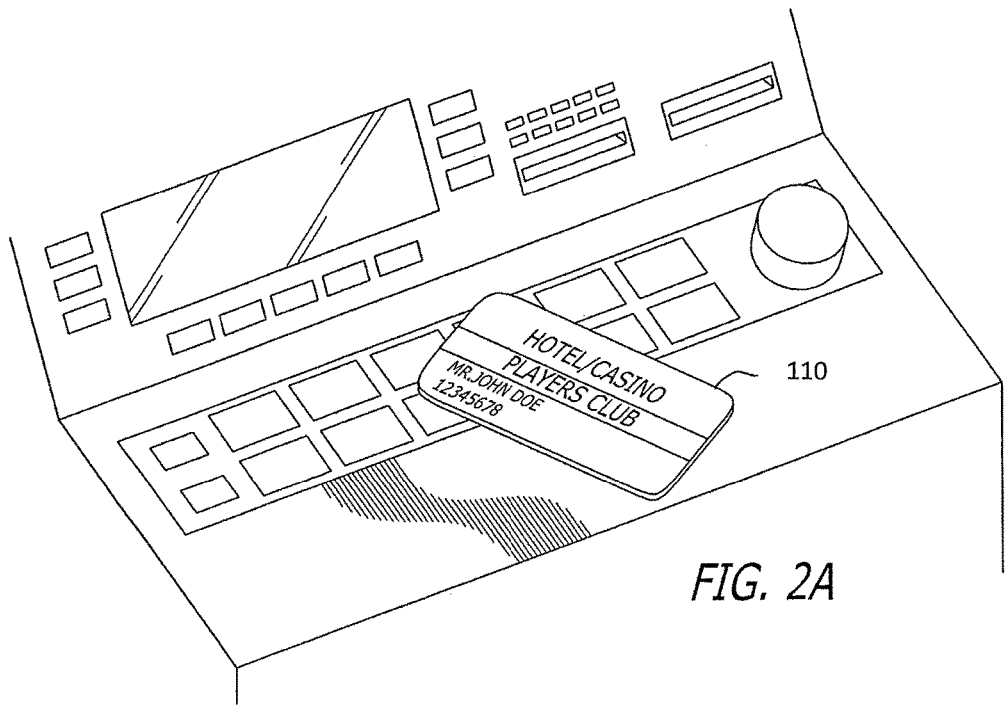
FIG. 2A illustrates a player card at a gaming machine, shown without an augmented reality view of the player card.
Figure 2B:
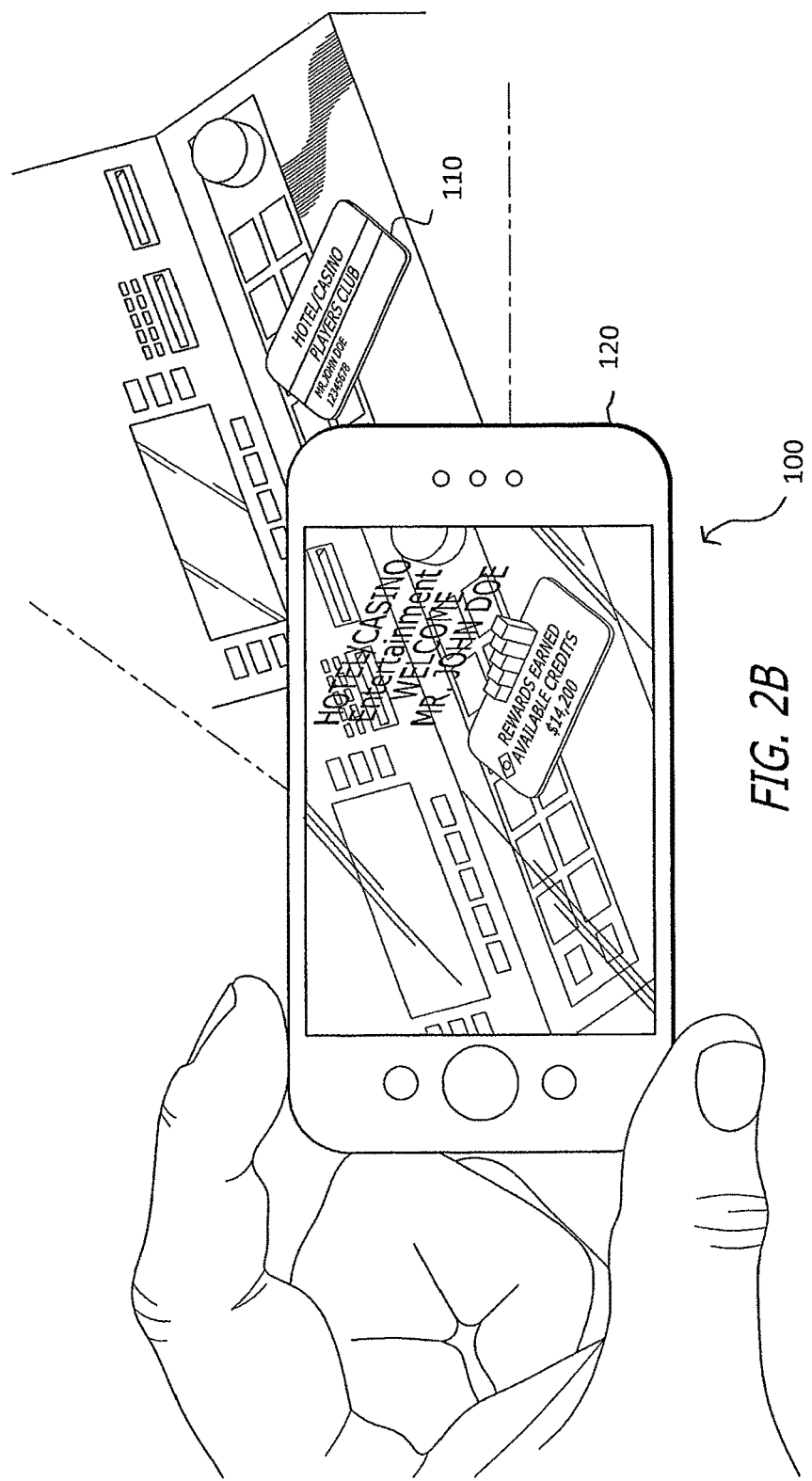
FIG. 2B illustrates a player card at a gaming machine, shown with an augmented reality view of the player card and associated player specific (e.g., credits available) information.

As shown in FIGS. 1A and 1B, the player card 110 contains information such as a patron's account number, as well as potential other gaming and/or non-gaming information. Using the account number, the following applications may be made available: (1) displaying player specific information, (2) showing promotions, and/or (3) enabling game play. These applications are explained in detail below:

Displaying Player Specific Information:

Referring now to one embodiment of the of the Augmented Reality Player Card system 100 shown in FIGS. 2A and 2B, when the Augmented Reality device scans the player card 110, the Augmented Reality device recognizes that the object is a player card belonging to the particular casino. The Augmented Reality mobile device 120 then reads the player code from the face of the player card 110 and sends the code to the backend of the Augmented Reality system. In some embodiments of the augmented reality player card system 100, the player code may be in the form of a QR code 130. Alternatively, the player code may be read from the card through Optical Character Recognition.

Once the player code is obtained, the Augmented Reality mobile device 120 sends the code to the backend of the Augmented Reality system. In one embodiment of the augmented reality player card system 100, the backend of the Augmented Reality system authenticates the player through a PIN (Personal Identification Number) entry. The PIN entry may be implemented using a virtual Augmented Reality image. Once the PIN is authenticated, the backend of the Augmented Reality system sends the player card 110 details to the Augmented Reality mobile device 120. In this embodiment, the Augmented Reality mobile device 120 then superimposes the player information above the player card 110, as viewed through the display of the mobile device 120 (or other suitable viewing device). In such an embodiment, the player can "virtually" view all the details stored on the player card 110 with unique 3D graphical representations, as shown in FIG. 2B, simply by directing the display of the mobile device 120 towards the player card.

Figure 2C:
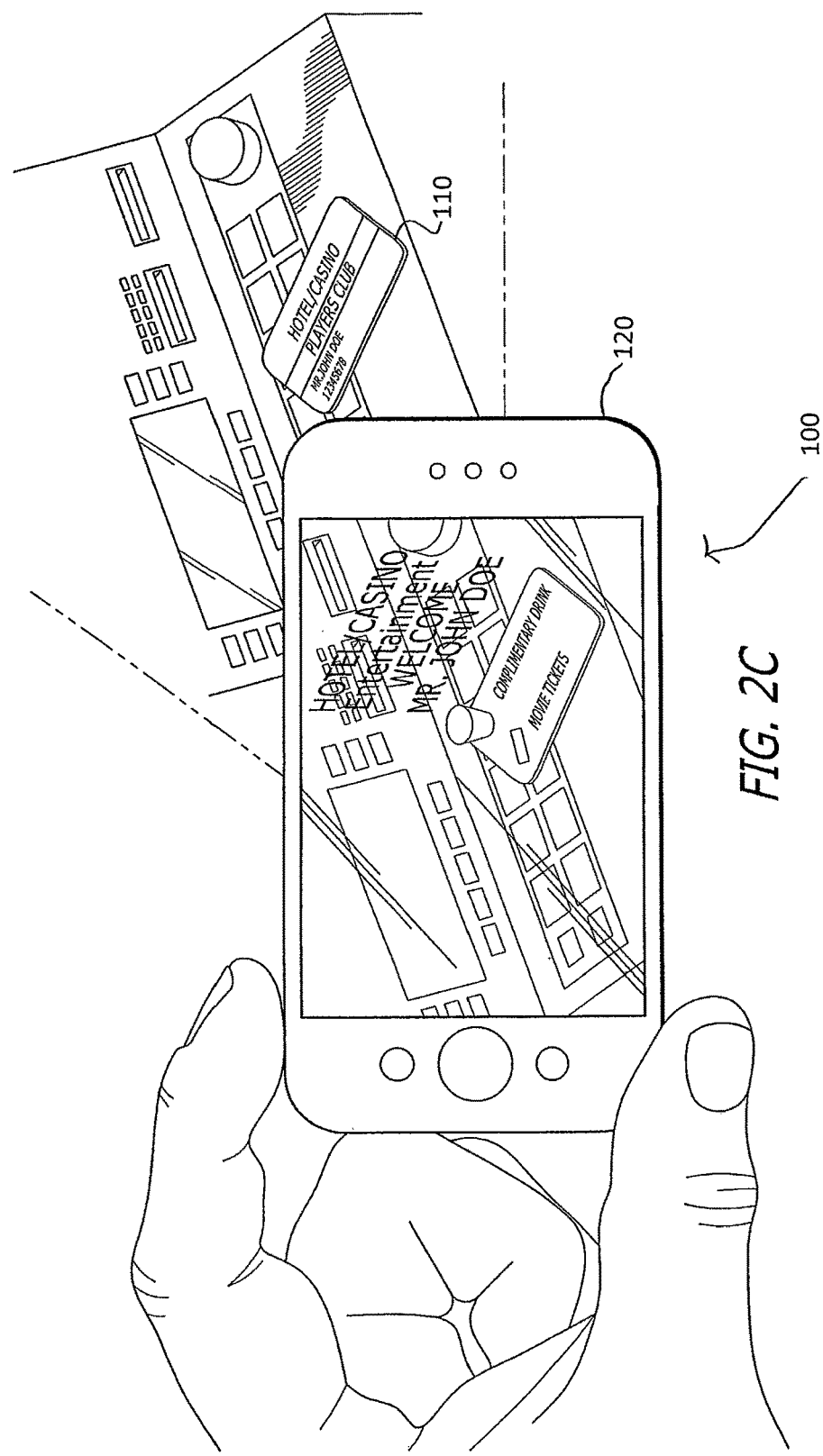
FIG. 2C illustrates a player card at a gaming machine, shown with an augmented reality view of the player card and associated promotional or voucher information.

Promotions:

Referring now to FIG. 2C, in some embodiments of the Augmented Reality Player Card system 100, the player may choose to view the promotional offers that have been acquired (e.g., the player may have an offer for a complementary drink, movie ticket, restaurant voucher or promotional points). This promotional information may be displayed after the player has seen the other player specific information (e.g., credits available). In one embodiment of the Augmented Reality Player Card system 100, the promotions being offered (and/or related information) may be displayed as a superimposed 3D image over the player card 110, as shown in FIG. 2C. In one aspect of this embodiment, the player may choose any of these offers by selecting the virtual buttons superimposed over the player card video.

Once the player chooses an option by selecting a virtual button on the display screen of the Augmented Reality mobile device 120, the mobile device communicates with the backend of the Augmented Reality system to take the corresponding action. For example, if the player chooses the complementary drink option, the Augmented Reality mobile device 120 can present an e-voucher with a message stating that the player can pick up the order a specific counter. If the player chooses the movie ticket, the Augmented Reality mobile device 120 can talk to the backend of the Augmented Reality system and issue an e-ticket voucher as an MMS, which the player can take to the movie theater. In this same manner, other promotional offers can be exercised by the player using the Augmented Reality mobile device 120 and the selection of a virtual button in the augmented reality environment.

Figure 2D:
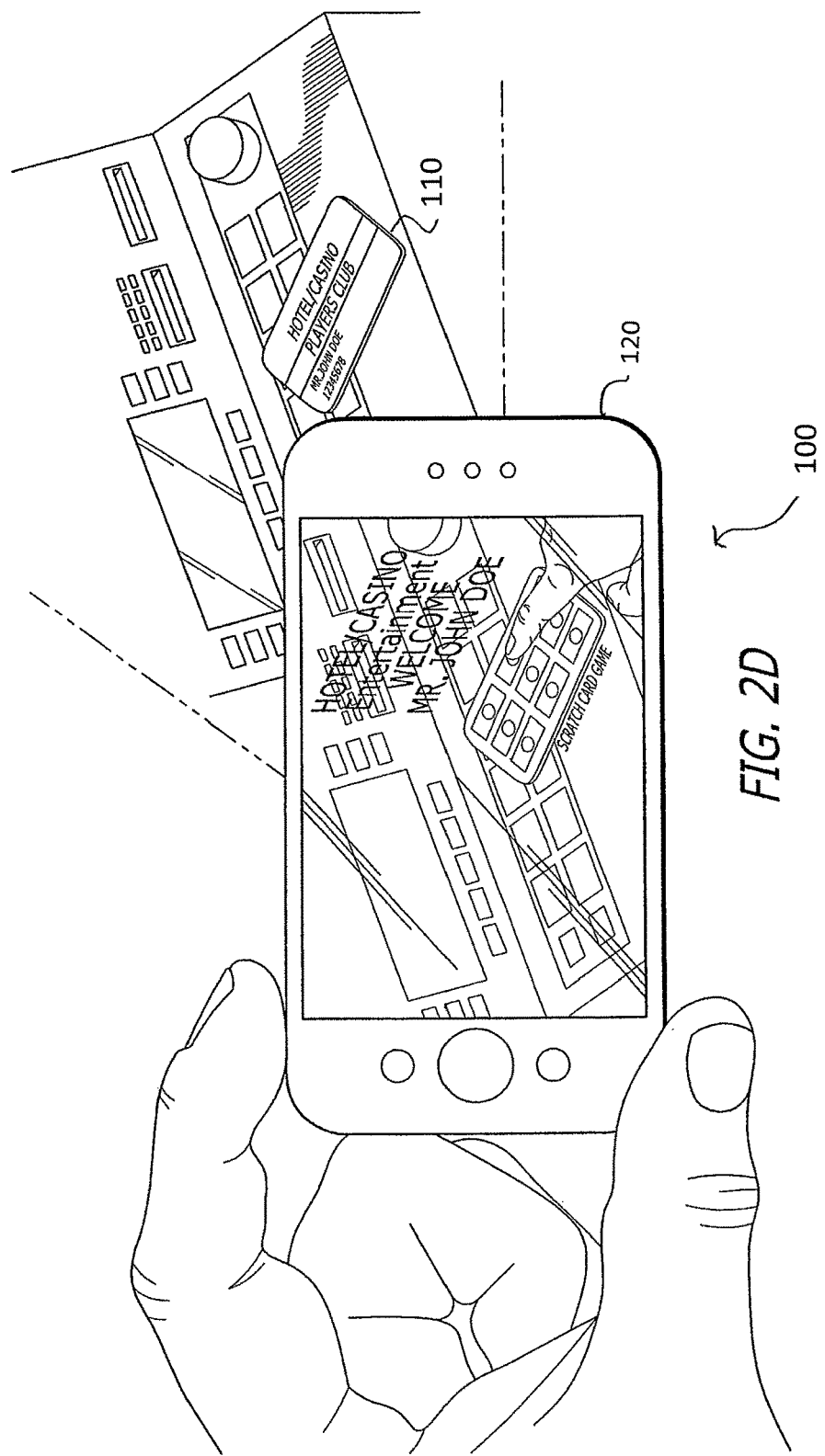
FIG. 2D illustrates a player card at a gaming machine, shown with an augmented reality view of the player card and associated bonus game information.

Enabling Game Play:

Referring now to FIG. 2D, in some embodiments of the Augmented Reality Player Card system 100, the Augmented Reality device can be used to play promotional games (e.g., as part of promotions). When the player chooses to play promotional games, options for games can be presented in the augmented reality environment. The player can choose to play a particular game by selecting a virtual button in the augmented reality environment.

Since this type of game is typically a bonus game, the Augmented Reality mobile device 120 can talk to an electronic bonus system engine to play the bonus game. In such an embodiment, the bonus game is super imposed over the player card 110. The player can play this superimposed game graphics in the virtual augmented reality environment, just as the player would play the bonus game on a traditional gaming machine (e.g., the player is able to "virtually" select bonus game indicators to participate in the game). The electronic bonus system tracks the points bet/earned during this play. An example of this activity is displayed in FIG. 2B.

In various embodiments of the Augmented Reality Player Card system 100, several features can be provided on an Augmented Reality device using player card 110. Though the Augmented Reality mobile device 120 using the player card 110 is used in a casino environment in some embodiments, the Augmented Reality Player Card system 100 can be implemented outside a casino environment using secure internet communication in other embodiments.

By using the Augmented Reality Player Card system 100 to view a player card 110, the system enables the player to view information associated with his player card, and in a virtual format that is visually impactful. The Augmented Reality Player Card system 100 may also be easy used by aged players, since the system does not require much physical movement by the player. The Augmented Reality Player Card system 100 is a technologically attractive interface which increases the entertainment value of the surrounding environment.

Figure 3:
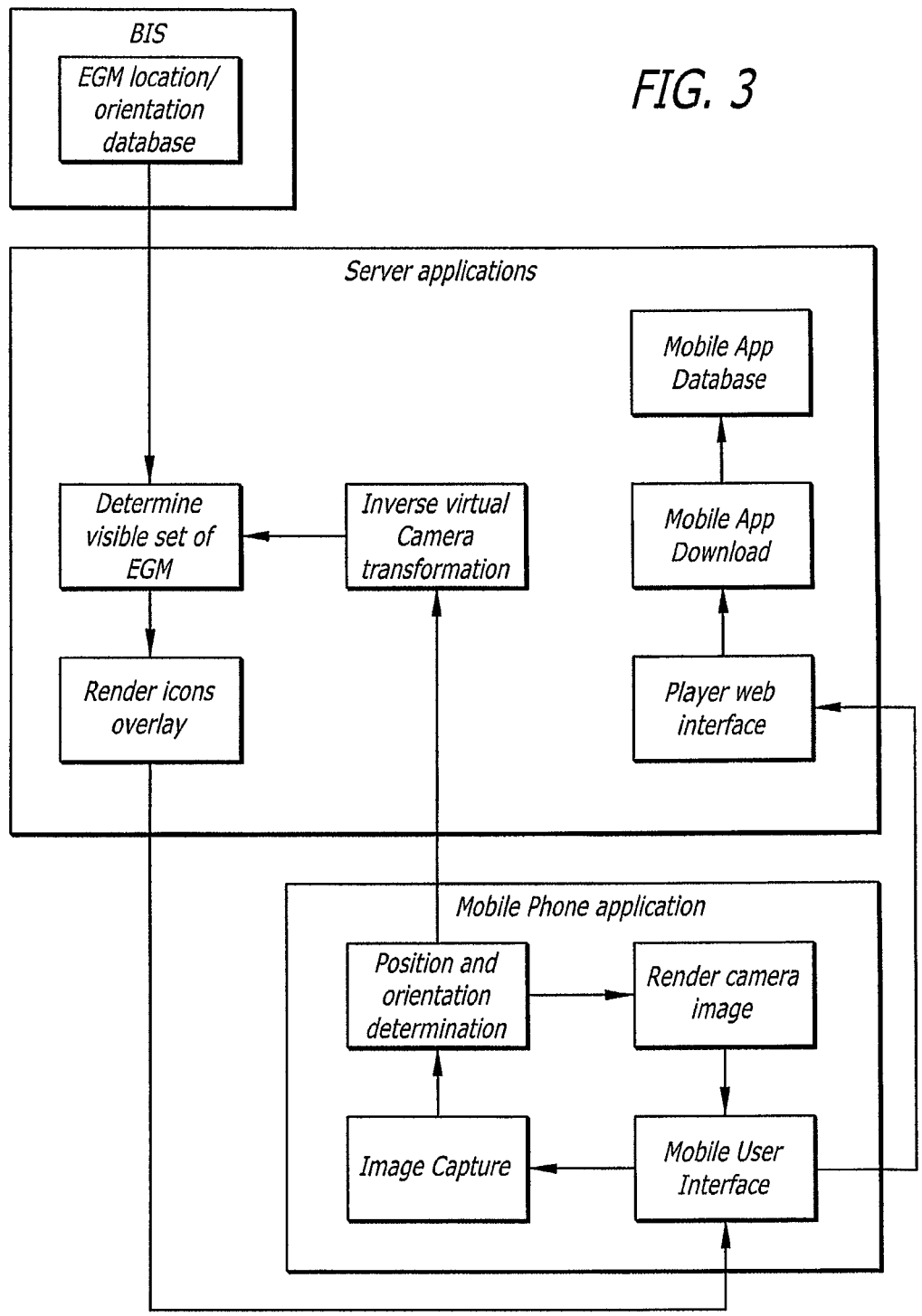
FIG. 3 illustrates a system overview of an augmented reality venue system.

Referring now to FIG. 3, in another aspect of some embodiments, gaming systems are utilized that include augmented reality viewing capabilities 300. In such embodiments of the disclosed gaming system, smart phones are utilized that include a built in gyroscope, as well as location tracking technology such as a digital compass and a GPS system (Global Positioning System). These features enable the accurate position and orientation of the smart phones and its user to be derived. Additionally, some other embodiments of the disclosed gaming system use object recognition and OCR (Optical Character Recognition) techniques combined with location/orientation derivation to provide players in casinos easy ways of finding games, progressive jackpots, particular machines, and other players of their choice.

The overall arrangement of the gaming systems that include augmented reality viewing capabilities may be seen in FIG. 3. In broad terms, gaming systems that include augmented reality viewing capabilities include an application loaded onto a camera-enabled smart phone, a back-end system for assisting the application, and integration modules for connecting to an existing Business Intelligence System (BIS).

In some embodiments, the Business Intelligence System provides a database or other structure that includes a table of the position and orientation of every gaming machine in a venue. Continuing, in such embodiments each position/orientation is associated with a unique identifier that enables this system to query the Casino Management System (CMS) to retrieve data for the gaming machine in question such as current occupancy, historical performance, current denomination and other relevant attributes.

Figure 4:
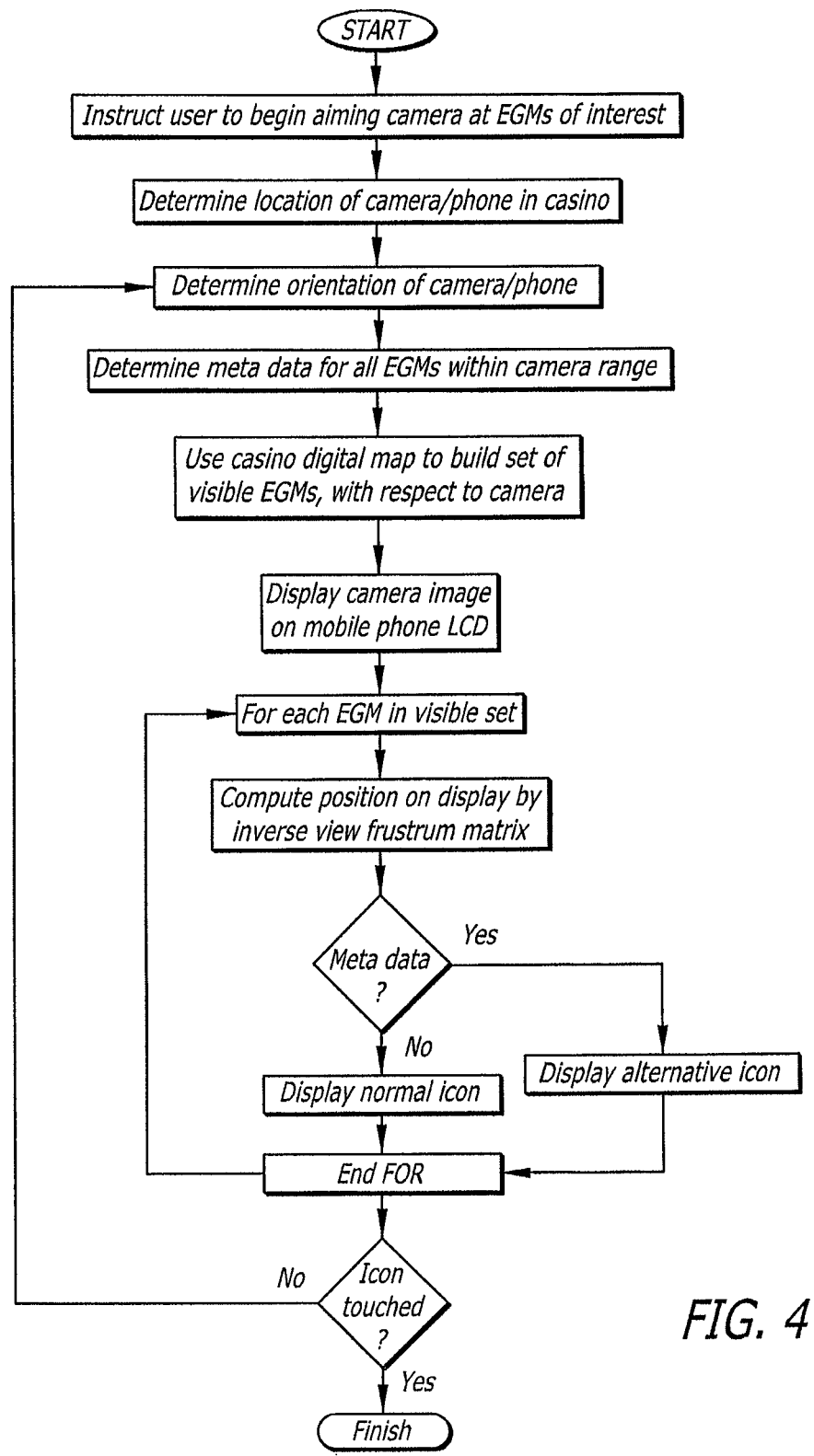
FIG. 4 illustrates a logic flow diagram of a process to build an augmented display.

The basic operation of one embodiment of a gaming system that includes augmented reality viewing capabilities is shown in FIG. 4. A player installs an augmented reality venue application on his phone, and activates the application when he enters the venue. Preferably, the application may be automatically activated by a Bluetooth or wireless message that is received by the phone when it passes through a portal such as a casino entrance. Alternatively, the application may be automatically activated by a "locale" condition programmed into the smart phone, tied to the venue's GPS location. In the simplest implementation, the application is manually activated by the player.

Once activated, the application of the gaming system having augmented reality viewing capabilities begins to control the built-in primary camera of the smart phone. In one such embodiment, a message is displayed on the smart phone display asking the user to aim the camera at gaming machines or other objects of interest in the venue.

Once aimed, the augmented reality application determines the location of the phone, by means such as GPS, Bluetooth, or cell tower triangulation. In another embodiment, the augmented reality application determines the location of the phone by analysis of the image being captured by the camera. In this regard, physical reference points may be placed in the casino for the camera to find. Next, the orientation of the phone is determined. This may be accomplished by accessing the internal digital gyroscope embedded within the smart phone.

Once the location/orientation of the smart phone is known, the objects of interest (such as gaming machines) that may be seen by the smart phone's camera may be computed. This may be achieved by placing the camera position/orientation within a virtual 3D representation of the venue. This virtual representation may be built up offline by parsing the Business Intelligence System table of position/orientations of gaming machines and other objects. From time to time, this representation may be updated to take into account the moving of gaming machines and signage around the venue.

In one embodiment of the gaming system having augmented reality viewing capabilities, a list of gaming machines and other objects currently visible to the camera are built up. For each object visible, a virtual position on the smart phone display may be derived by performing an inverse projection matrix on the co-ordinates of the gaming machine. The camera captured image is rendered on the smart phone display, and an icon is overlaid on the image for each visible object. An example of this output is shown in FIG. 5.

Figure 5:
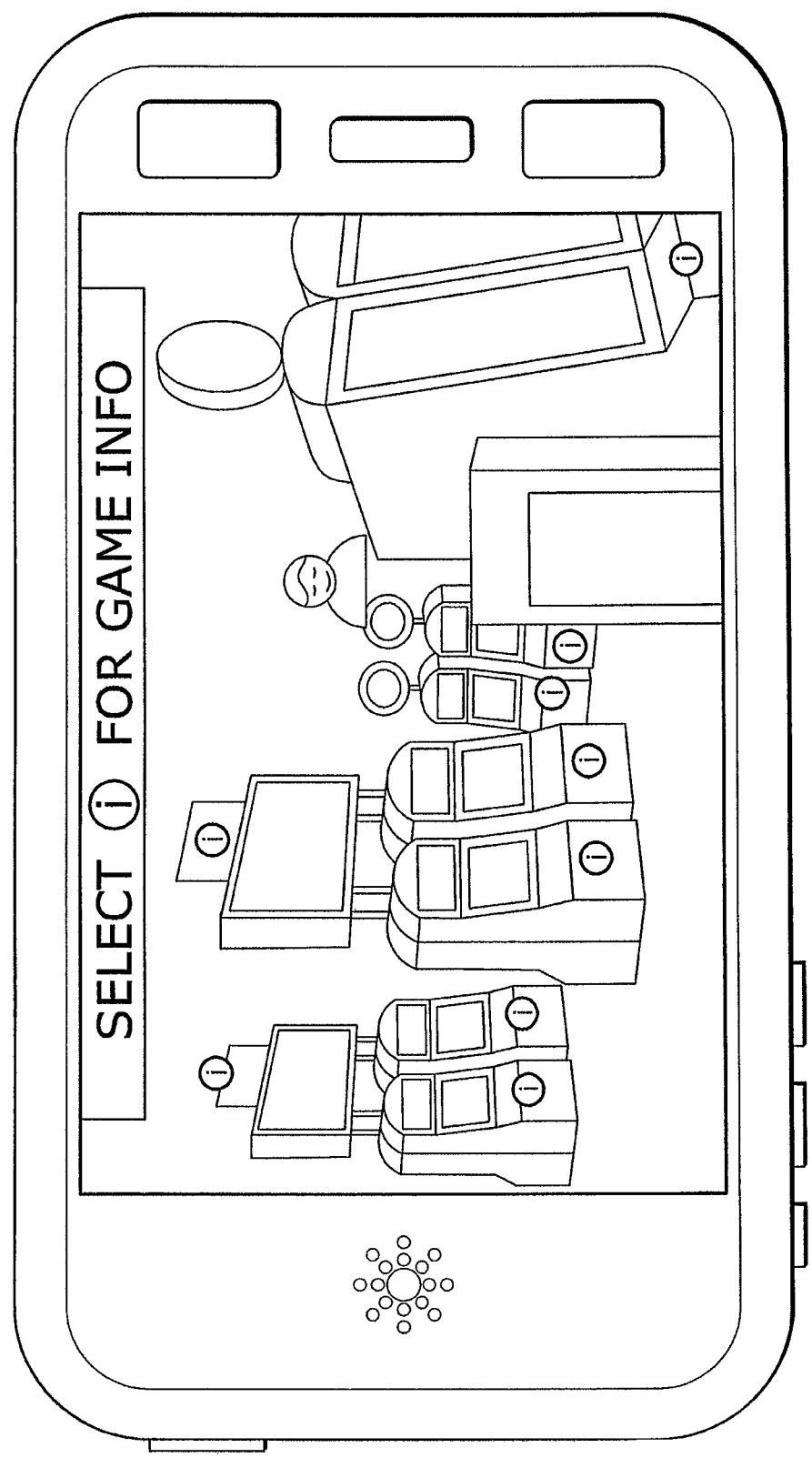
FIG. 5 illustrates a smart phone that is displaying an example output from an augmented reality venue mobile application.

As shown in FIG. 5, in another aspect of the gaming system having augmented reality viewing capabilities, some different types of icons may be shown depending upon the type of object or some meta-data associated with an object. In the example shown in FIG. 5, a standard gaming machine is shown with a green icon, a gaming machine that is being played (and thus unavailable) is shown with a blue icon, and the gaming machine with the highest payout over a recent period of time (i.e. the 'hottest' gaming machine) is shown with a red icon.

Another type of icon shown in the embodiment of FIG. 5 is a user icon. This user icon represents another player, such as a player that the current user has an affinity with (e.g., a spouse or relative). In some embodiments of the gaming system having augmented reality viewing capabilities, the player may register affinities in the CMS or via the augmented reality venue application. By employing such an embodiment, the player is able to find their spouse by simply panning their camera around until the user icon is straight ahead.

Notably, icons such as the user icon need not represent an object directly visible by the player. In some embodiments of the augmented reality venue system, signage and banks of gaming machines may be between the player and their spouse, but do not affect the operation of this system.

Figure 6:
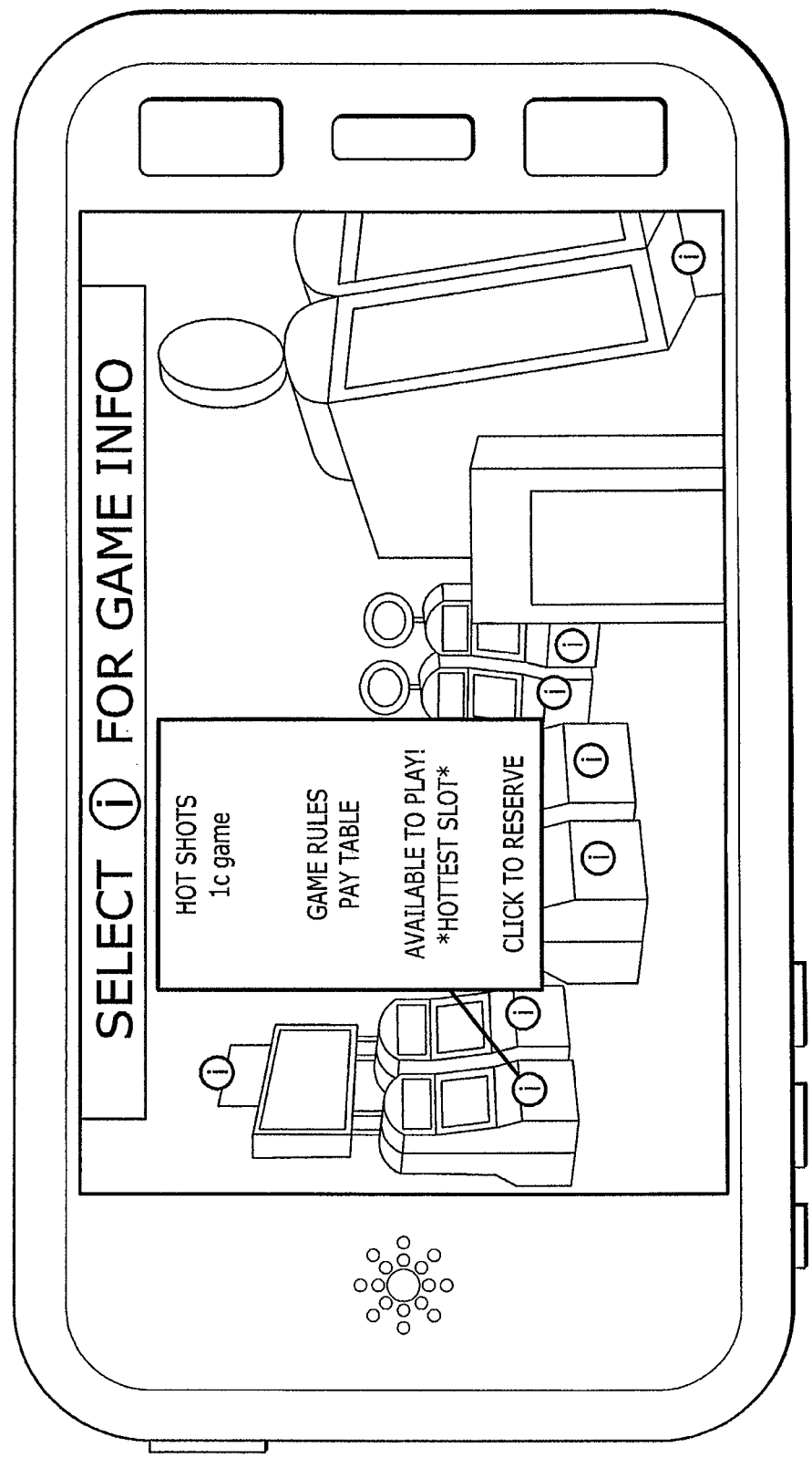
FIG. 6 illustrates a smart phone that is displaying an example output from an augmented reality venue mobile application with a game highlighted.

As shown in FIG. 6, once an icon is shown, the player may touch the touchscreen on their smart phone at the location of the icon to bring up information about the object in question. FIG. 6 shows an example of such information. In this example, the user has selected the red icon near a 'Hot Shots' game on the image displayed on his phone. This selection causes a pop-up window with information about the game, including the detail that this is the 'Hottest Slot' by some measure (e.g., perhaps this gaming machine has paid out the most money over the last 24 hours).

In some embodiments, the pop-up window also lets the player know that this gaming machine is available to play, which might not be apparent if there are any obstructions between the gaming machine and the user. In one such embodiment, this availability information is obtained by the back-end systems by querying the CMS to see if any credits or player tracking card are inserted.

Figure 7:
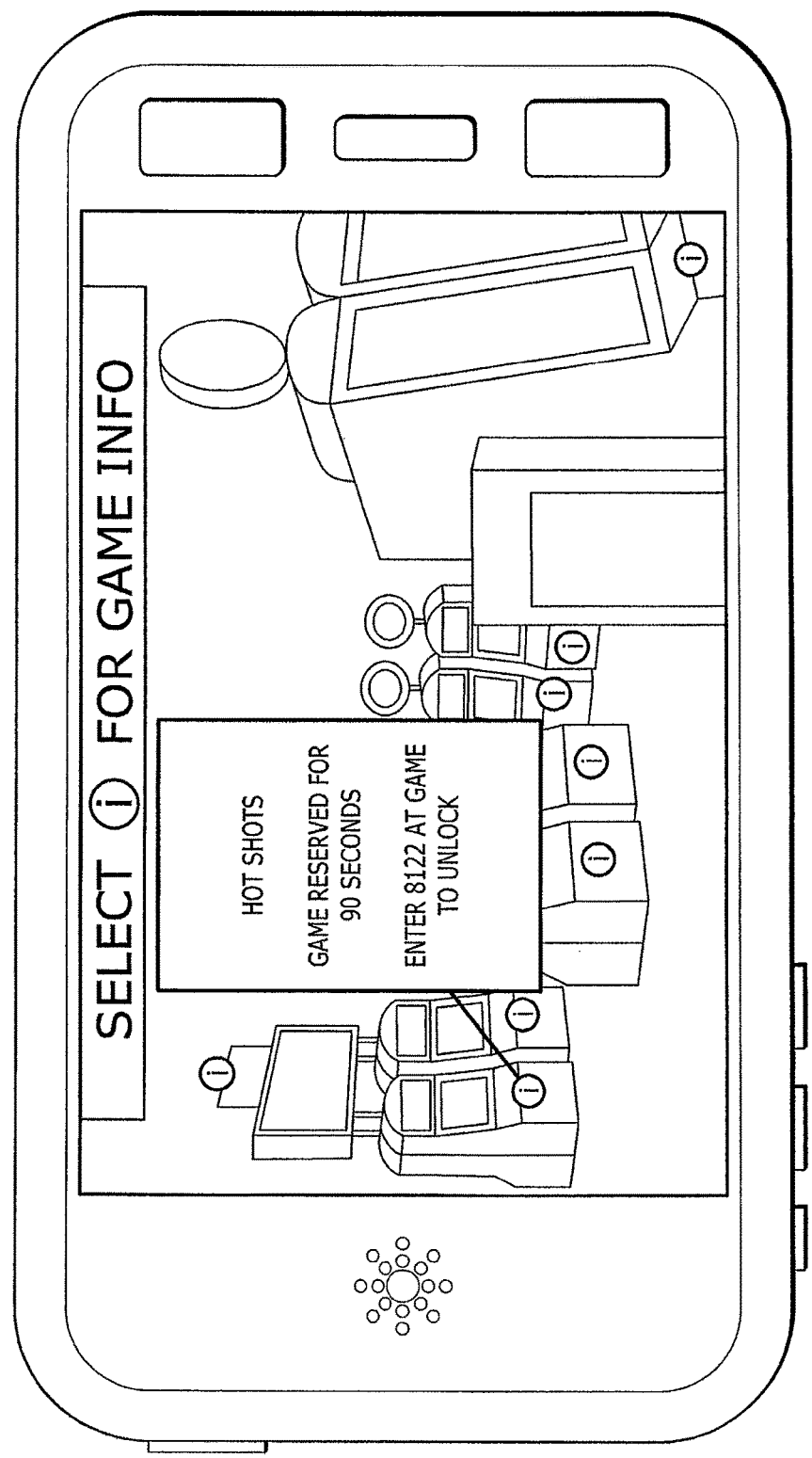
FIG. 7 illustrates a smart phone that is displaying an example output from an augmented reality venue mobile application with a game reserved with a Personal Identification Number.

Referring now of FIG. 7, in another aspect of a gaming system having augmented reality viewing capabilities, the pop-up window also enables a player to "reserve" a gaming machine. Reserving gaming machines is popular in some markets, and this novel feature extends the reserving feature. If a player chooses to reserve the gaming machine by selecting the button on their smart phone, a message is sent up from the phone to the back-end system, and onto the CMS to reserve the gaming machine. Preferably, the CMS generates a PIN and transmits this PIN to the gaming machine and back to the phone. This PIN is displayed on the phone, as shown in FIG. 7. The gaming machine then locks up for a period of time to give the player time to walk over. When the player reaches the gaming machine, he or she enters the matching PIN and the game is unlocked. Once the time limit is reached, the gaming machine automatically unlocks to prevent the gaming machine from being held out-of-service.

Figure 8:
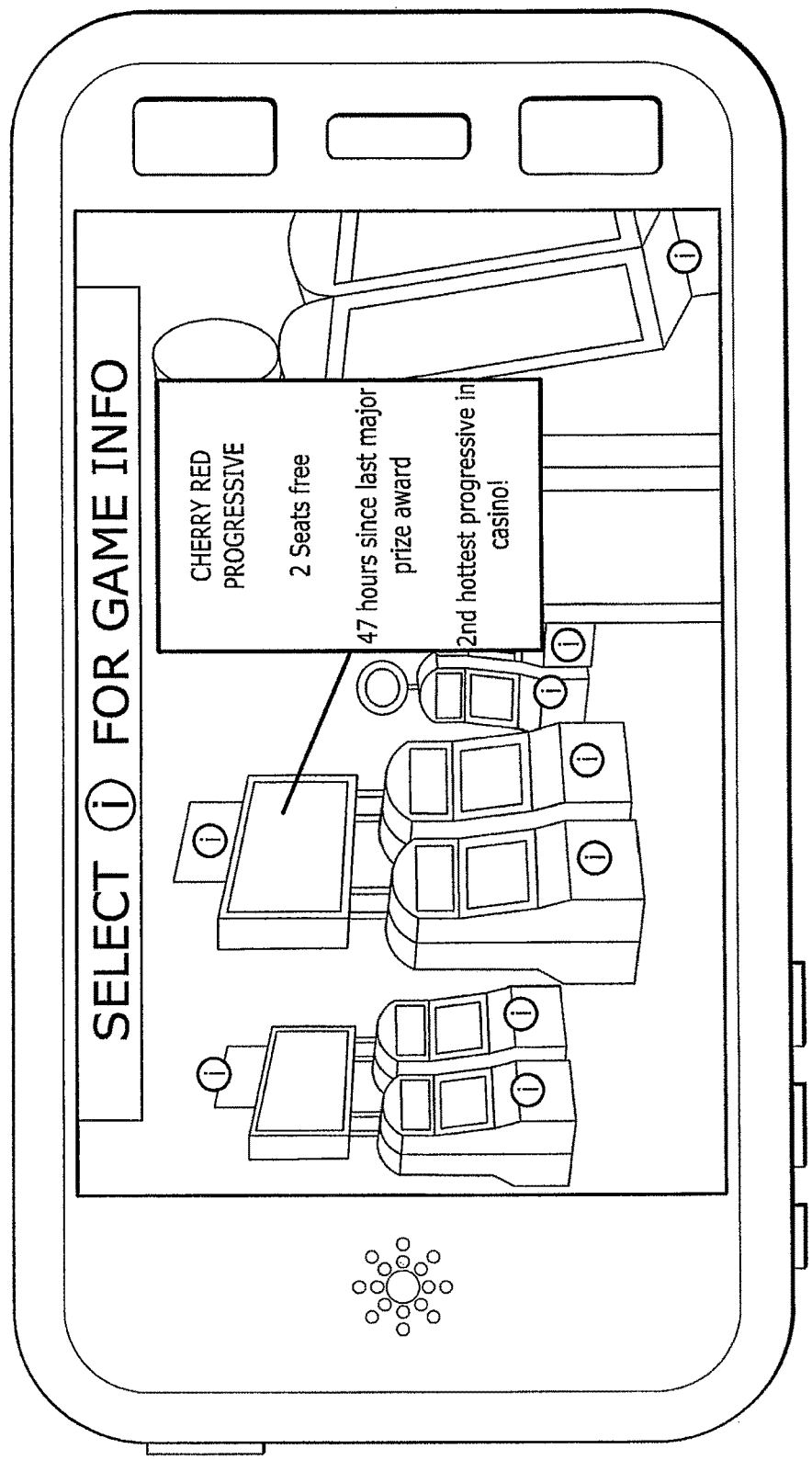
FIG. 8 illustrates a smart phone that is displaying an example output from an augmented reality venue mobile application with signage highlighted.

Referring now to FIG. 8, an embodiment of a gaming system having augmented reality viewing capabilities is shown in which a user has selected an augmented reality venue with the signage highlighted. This type of reservation may be restricted to users of a certain standing; for example, "Platinum Level" players, to ensure they have priority for popular games.

Figure 9:
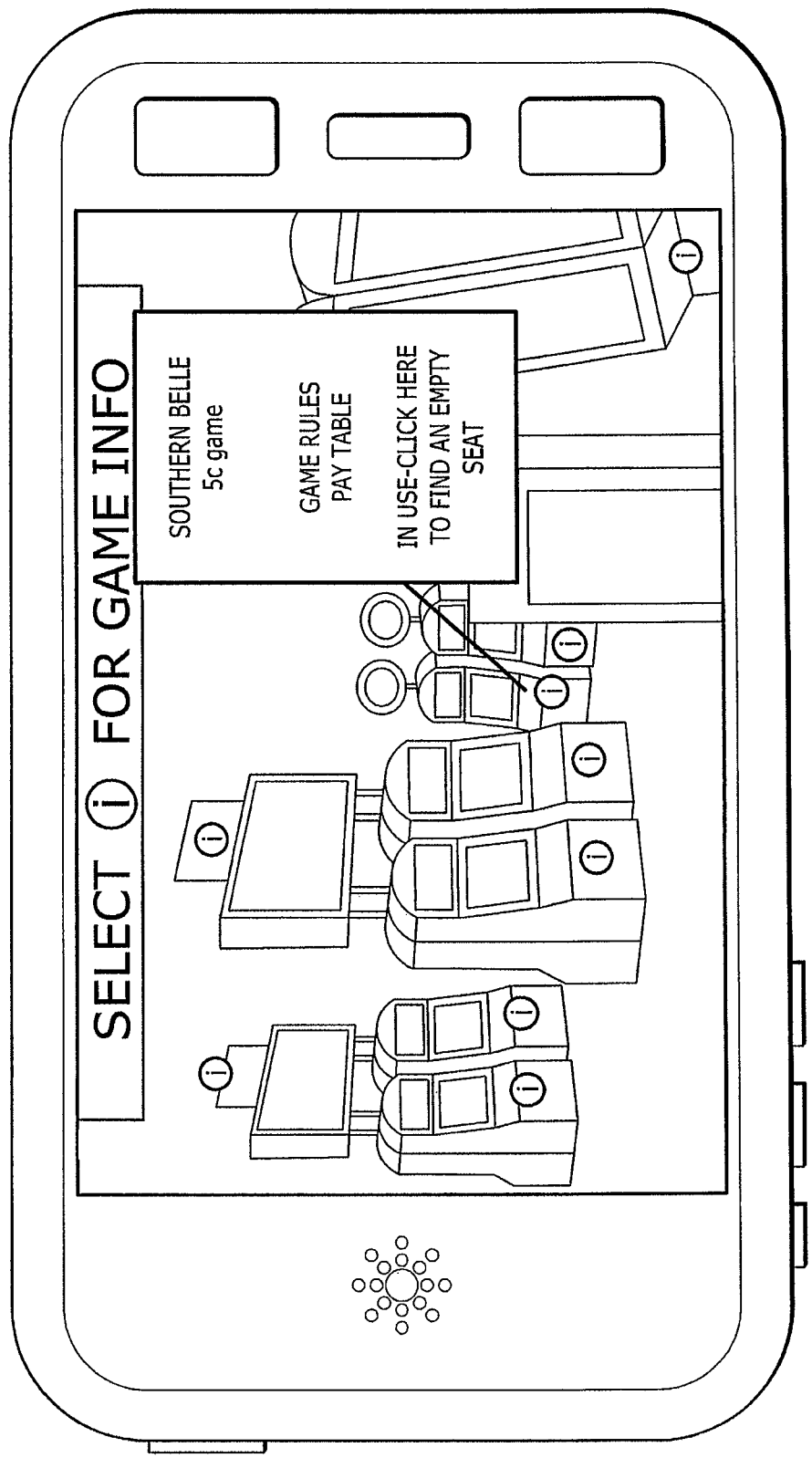
FIG. 9 illustrates a smart phone that is displaying an example output from an augmented reality venue mobile application with an "in-use" game highlighted.

FIG. 9 is an embodiment of a gaming system having augmented reality viewing capabilities in which a user has selected a game that is currently in use by another player. In this scenario, the user is offered the choice of finding another game of the same type elsewhere in the venue. In some embodiments, this action is performed by the backend querying the CMS as to other games with identical themes, and filtering this list by only matching gaming machines where credits are zero and no player tracking card is inserted.

Once the list is formed, the list is sorted by distance from the user based upon the gaming machine location table in the Business Intelligence System. The nearest gaming machine matching is then presented on the screen, if it is visible, by a vertical arrow icon pointing at the gaming machine. In some embodiments the arrow icon is flashing. In another aspect of one embodiment, if the nearest matching gaming machine is off of the screen, a horizontal arrow is displayed that indicates which way the player should rotate themselves to bring the matching gaming machine into view. As the player rotates himself, holding the phone in front of him, the arrow position is updated, and eventually replaced by a vertical arrow pointing directly at the gaming machine.

In one embodiment of a gaming system having augmented reality viewing capabilities, "Platinum" players (or other selected players) are presented with another option when all gaming machines of a particular type are in use, or the player has a particular favorite machine. These players may be given the option to "pre-reserve" a gaming machine or game, such that they will be informed by the augmented reality application the moment that their game, or favorite machine, becomes free. At this point, the gaming machine in question will be reserved for a period of time, using the PIN method described above.

Figure 10:
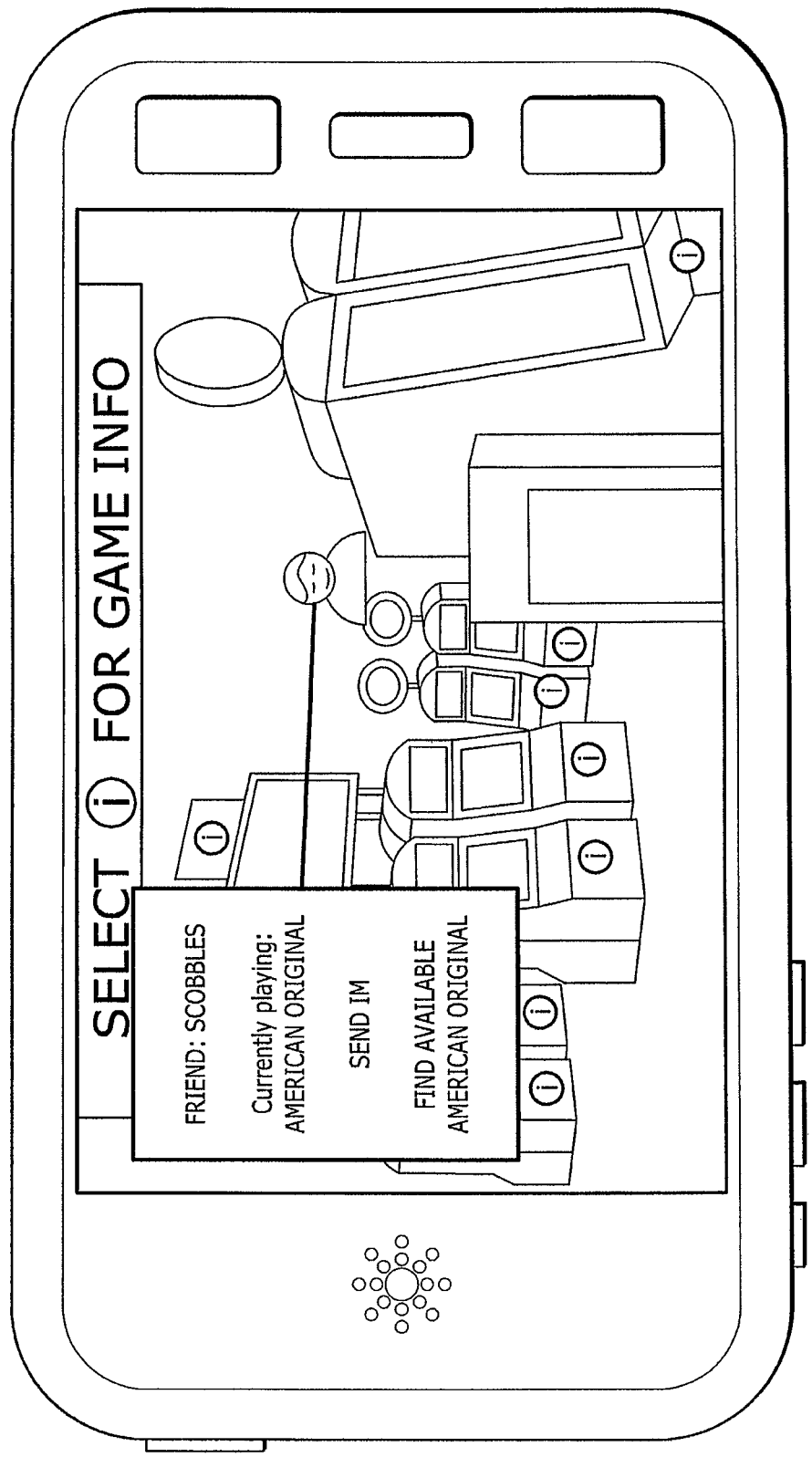
FIG. 10 illustrates a smart phone that is displaying an example output from an augmented reality venue mobile application with a user highlighted.

Referring now to FIG. 10, an embodiment of a gaming system having augmented reality viewing capabilities shows yet another feature. As mentioned above, players may register affinities to other players. In this example, as well as being able to find their friends or spouse, the player may choose to find the same game (at a different gaming machine) they are playing, or possibly sending an instant message (IM) to their friend to be displayed on the friend's gaming machine. In the case of community games, the "Find Available" option may also allow a player to find a free seat in the same community game as their friend.

Some preferred implementations of the disclosed embodiments use (1) a smart phone for the client that has a GPS or other positioning system, as well as a gyroscope for accurate orientation detection, (2) any suitable web server for communication with the smart phone and registration of players, and (3) OpenCV image analysis software. Additionally, some embodiments provide features that include, by way of example only: (1) enabling players to quickly find objects of interest, (2) increasing casino revenue by helping players find their favorite games quicker, (3) enabling players to reserve games from their phone, (4) leveraging technology that players already have, and (5) utilizing a system that is inexpensive to deploy, since it does not require any new infrastructure. In other aspects, some embodiments provide: (1) the use of the phone as a way of finding objects in a casino, (2) the ability to reserve games from the phone, and unlock the games with a PIN, (3) notification when games become available, and (4) the ability to find other players, and the games that they are playing.

In another aspect of some embodiments, gaming systems are utilized that include augmented reality gaming capabilities 1100. In such embodiments of the disclosed gaming system, smart phones are utilized that include built-in object recognition technologies and OCR (Optical Character Recognition) techniques combined with location/orientation derivation to provide players in casinos with additional gaming options and opportunities. In one embodiment of a gaming system that includes augmented reality gaming capabilities 1100, such object recognition technologies and OCR capabilities are similar to those provided by Google's ("Goggles") application.

Figure 11:
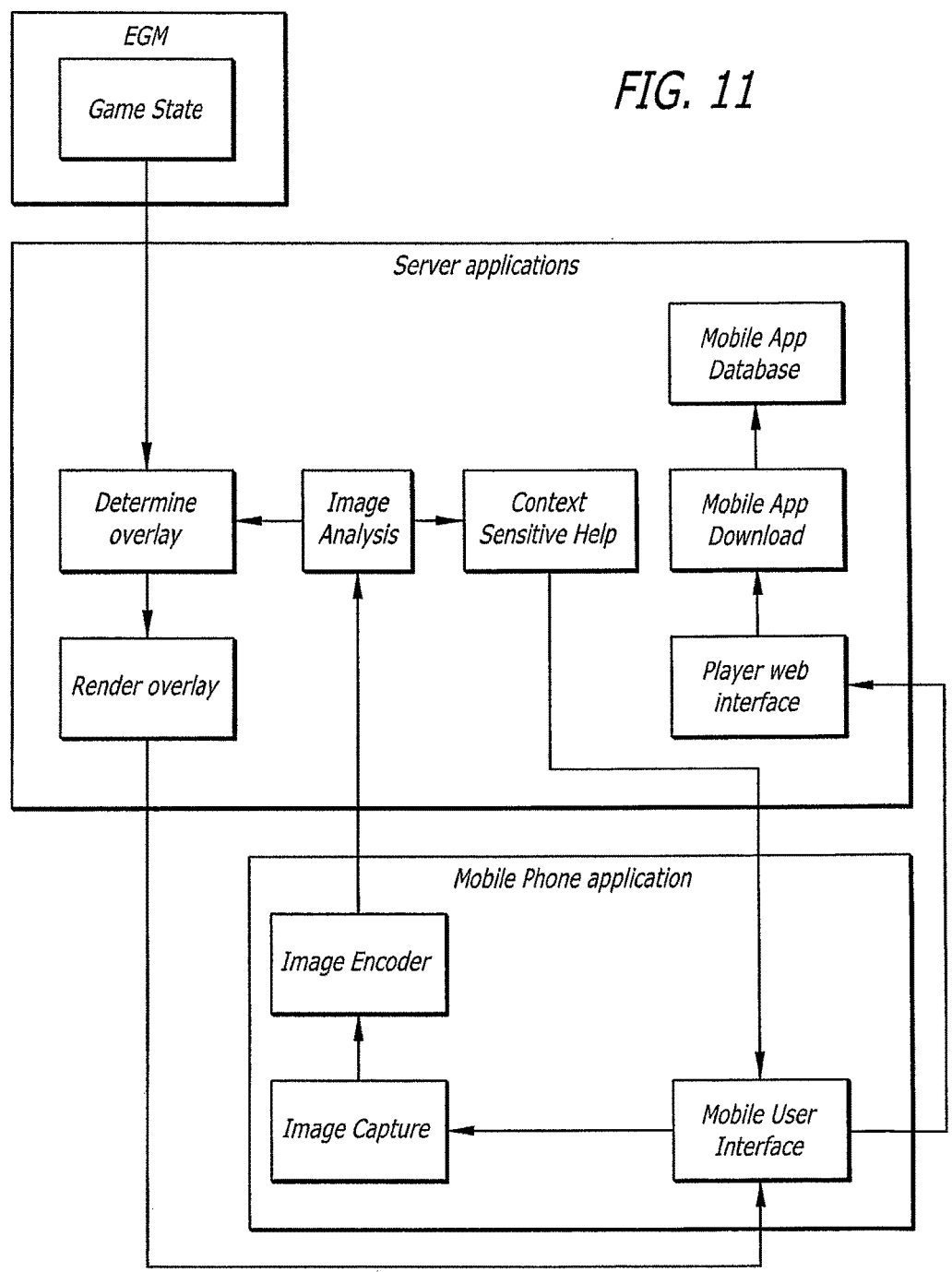
FIG. 11 illustrates a system overview of an augmented reality gaming system.

The overall arrangement of the modules that make up an embodiment of a gaming system that includes augmented reality gaming capabilities 1100 may be seen in FIG. 11. In some embodiments, the gaming system having augmented reality gaming capabilities 1100 consists of an augmented reality gaming application loaded onto a camera-enabled mobile smart phone, a back-end system for assisting the application, and in some scenarios, additional software modules as part of the gaming machine software.

Figure 24:
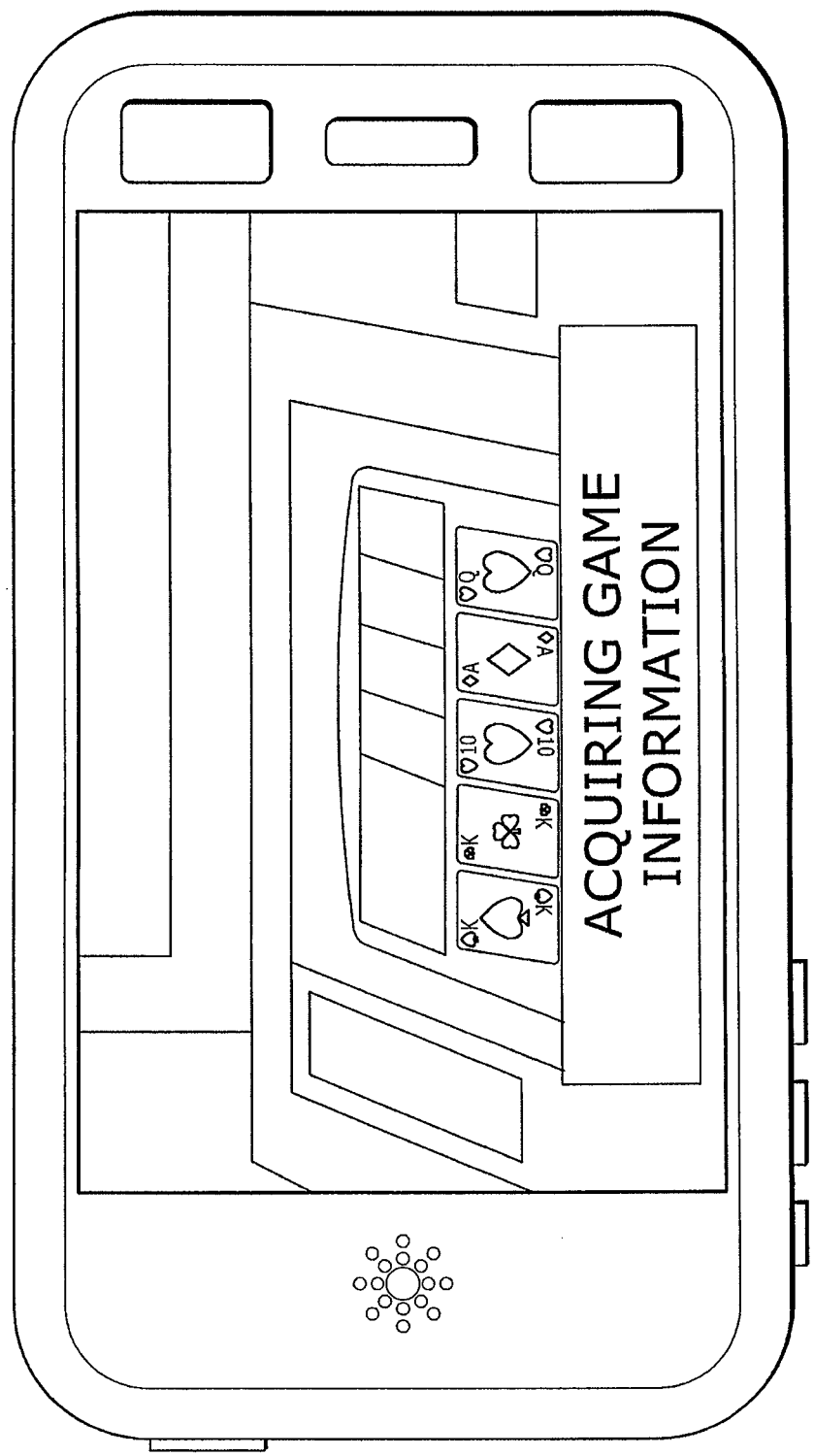
FIG. 24 illustrates a smart phone that is displaying a game application menu of an example video poker acquisition and decoding.

In one implementation of a gaming system that includes augmented reality gaming capabilities 1100, the gaming process proceeds in the following manner. A player approaches a game machine to play a game (e.g., Joker Poker). Joker Poker is a video poker game in which a player makes a decision about which cards to hold or draw. During the game, the player may reach a point where the player is unsure of the correct strategy with which to proceed. When this point of uncertainty occurs, the player may take out his mobile phone and select the augmented reality gaming assistance application. Next, the player is prompted to point his smart phone's camera to the gaming machine screen. Once the camera is aimed at the screen, the player presses the camera shutter button, and an image is captured (as seen in FIG. 24).

The augmented reality gaming assistance application transmits the image to the backend server via a 3G (third generation) or GPRS (General Packet Radio Service) encrypted SSL (secure socket layer) session to a public web service and awaits a response. The backend server, using object recognition and OCR technology determines the following from analyzing the image: (1) the paytable of the game, and thus, the game title; (2) the current game state; and (3) the player's credit/bet information. From the first two of these items, all possible strategies are determined by the system. This information, along with the game name and state, is transmitted back to the augmented reality gaming assistance application on the mobile phone over the 3G connection.

Figure 25:
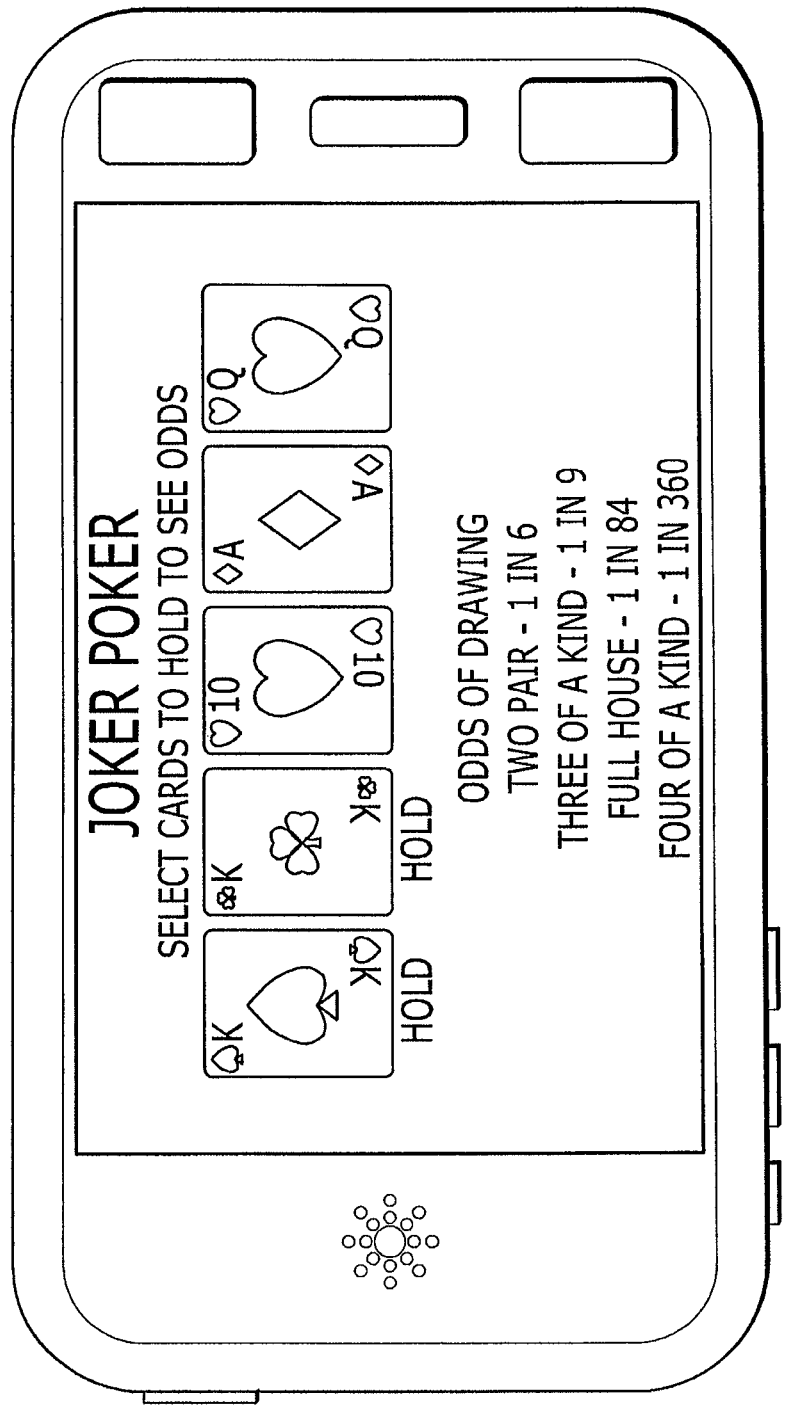
FIG. 25 illustrates a smart phone that is displaying a game application menu of an example video poker analysis presentation.

In one embodiment, the augmented reality gaming assistance application may present the information to the player in a number of ways, as shown in FIG. 25. In the example of FIG. 25, the theoretical best choice for the player is presented for the game of Joker Poker, along with information concerning the possible outcomes to the game. Notably, the player is free to experiment on the assistance application of the player's smart phone, selecting and de-selecting potential cards to hold. During this process, the odds are presented below the cards, as the cards are being updated to reflect the current scenario (e.g., after each selection/deselection).

While the augmented reality gaming assistance application is clearly useful for beginner players, the application is also useful for more expert players by taking into account progressive jackpots which may cause strategy to vary depending upon the current progressive amount. Furthermore, the augmented reality gaming assistance application provides additional benefits whenever variables are added to games, such as a wild card, or when more complex odds are associated with the outcome of a game.

In some embodiments of the gaming system having augmented reality gaming capabilities 1100, once the game title is determined, other information can also be made available by the phone application. For example, links to tutorials, discussion forums and social networking sites specific to the game may be offered. Such tutorials may take into account the current state of the game and offer context-sensitive help.

In other, more sophisticated, embodiments of the gaming system that include augmented reality gaming capabilities 1100, the gaming process proceeds in the following manner. While the video poker example presented above provides the content on the player's smart phone related to the game, these above-described embodiments do not augment the output of the gaming machine directly. However, in more sophisticated embodiments of the gaming system that includes augmented reality gaming capabilities 1100, an augmented display captures the output from the gaming machine via the camera in the phone, and overlays virtual graphics on the smart phone's display that either (1) appear to be on the gaming machine display when viewed via the mobile phone, or (2) augment the gaming machine display with elements that indicate points of interest on the gaming machine.

Figure 12:
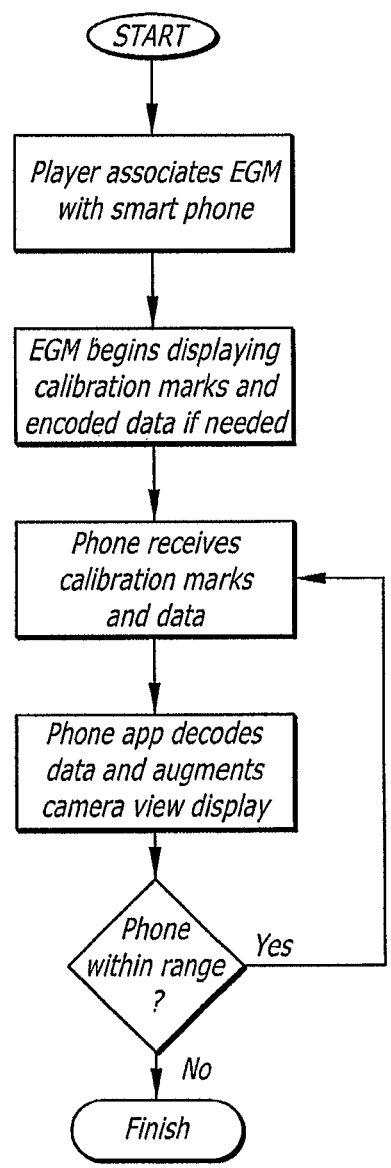
FIG. 12 illustrates a logic flow diagram of a process to provide a game on a smart phone.
Figure 15:
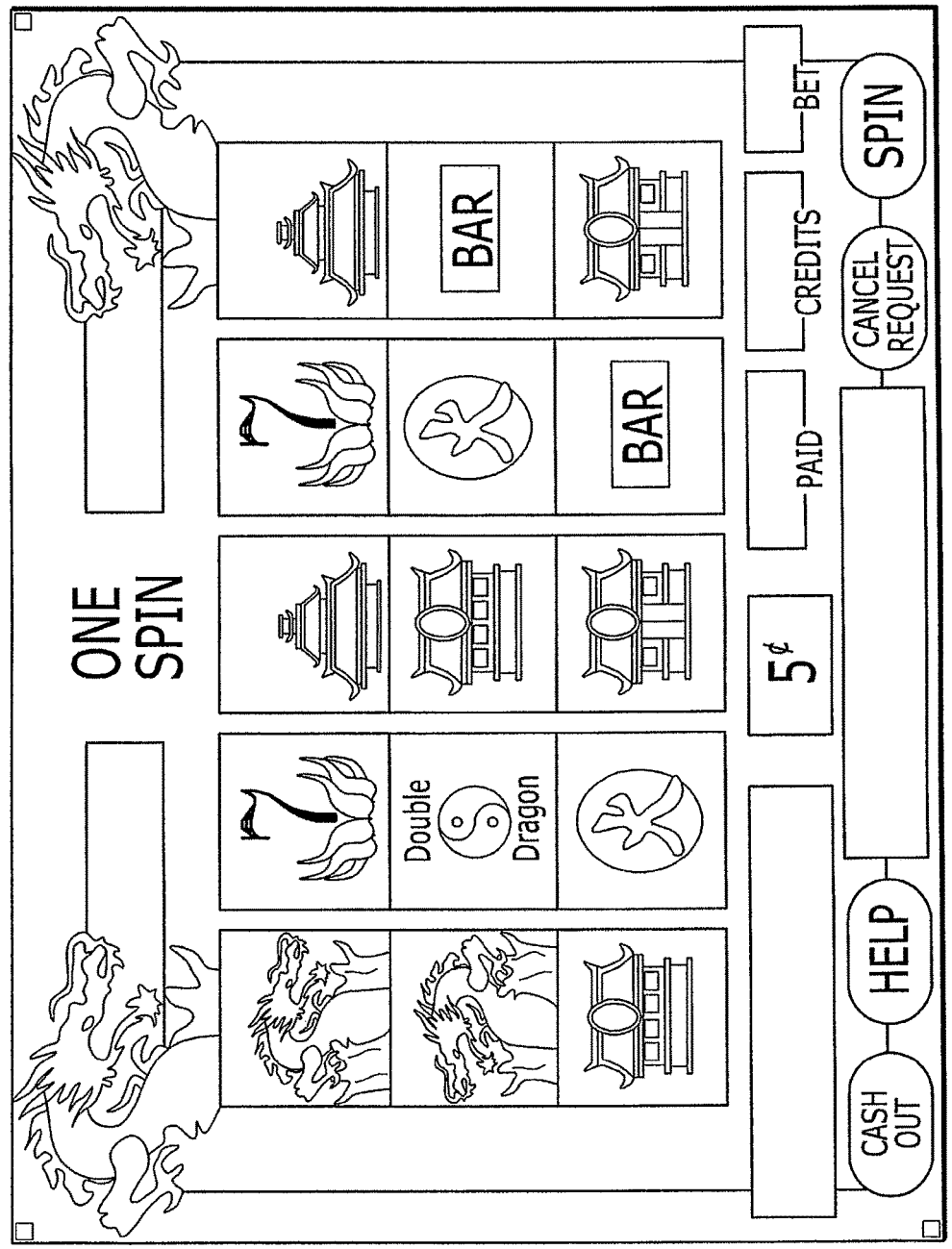
FIG. 15 illustrates an example gaming machine output with calibration and data marks enabled.
Figure 16:
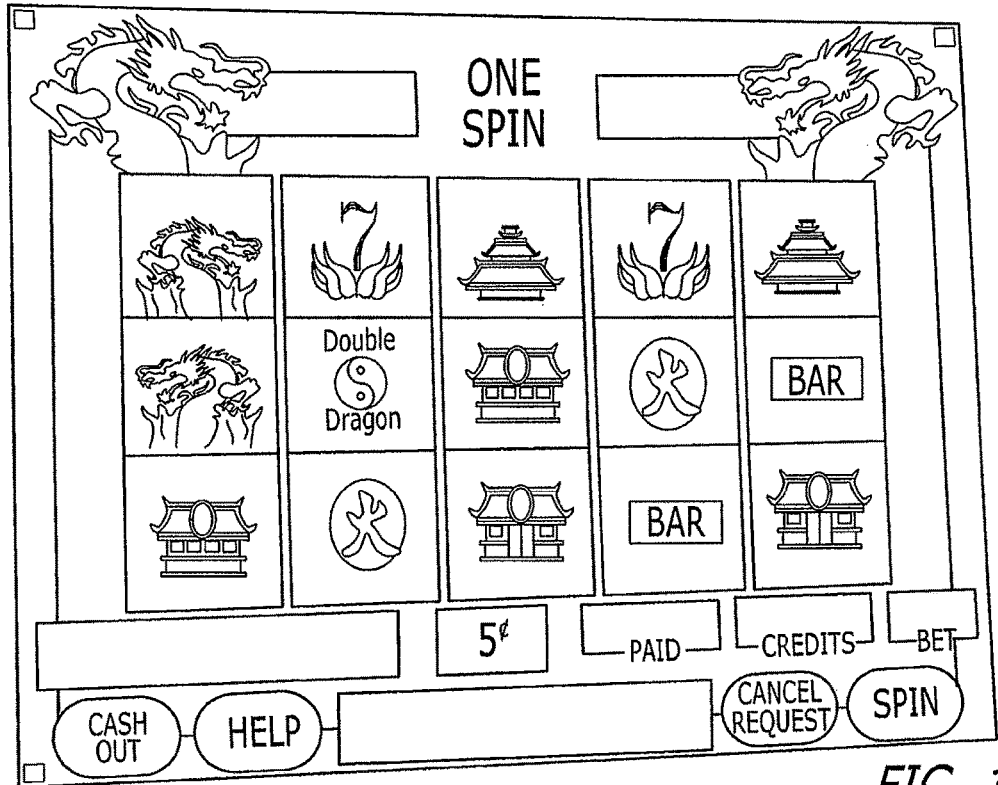
FIG. 16 illustrates an example gaming machine output from a smart phone's camera-perspective.

Referring now to FIG. 12, one embodiment of a gaming system having augmented reality gaming capabilities 1100 that illustrates how an augmented feature may be deployed is shown. Firstly, a player associates the gaming machine being played with the phone he is holding. This association may be accomplished in a number of ways, two of which are described below. In the first association technique, the gaming machine begins displaying calibration marks at the corner of the LCD display, or in other unobtrusive positions, once the augmented session has begun. An example of these calibration marks is shown in FIG. 15. Continuing, as the player holds the camera of the smart phone up in front of the gaming machine, the application-controlled camera captures the image of the gaming machine, including the game LCD output. Since it is unlikely that the player will be holding the camera directly parallel to the LCD, the image of the LCD will likely be slightly trapezoidal, as shown in FIG. 16.

Figure 17:
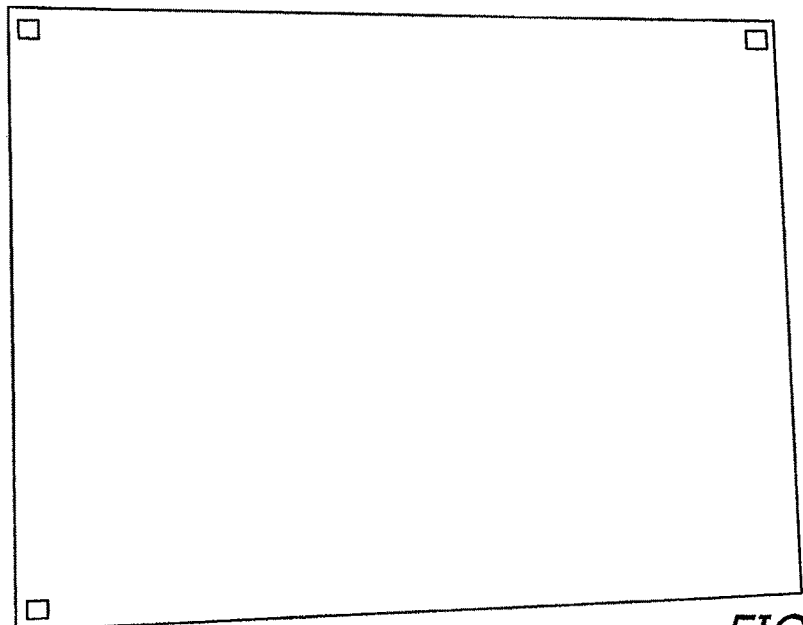
FIG. 17 illustrates calibration marks as extracted from image capture.

Referring now to FIG. 17, the object recognition system takes this image and extracts the calibration marks. In some embodiments, the object recognition system uses a standard object recognition algorithm. Notably, this amount of computation is well within the real-time capability of today's modern smart phone. If more advanced computational processing is required for some reason, the object recognition algorithm may be run by transmitting the image to the backend server, where the image may be processed. This is not the preferred solution due to the time taken to transmit the image would likely interfere with real-time overlay by producing significant lag. In a more preferred embodiment, once the calibration marks are decoded, the mobile phone application overlays images at suitable points on the camera-derived image. The techniques for achieving this image overlay are described above with respect to the gaming system venue having an augmented reality venue 300.

Figure 23:
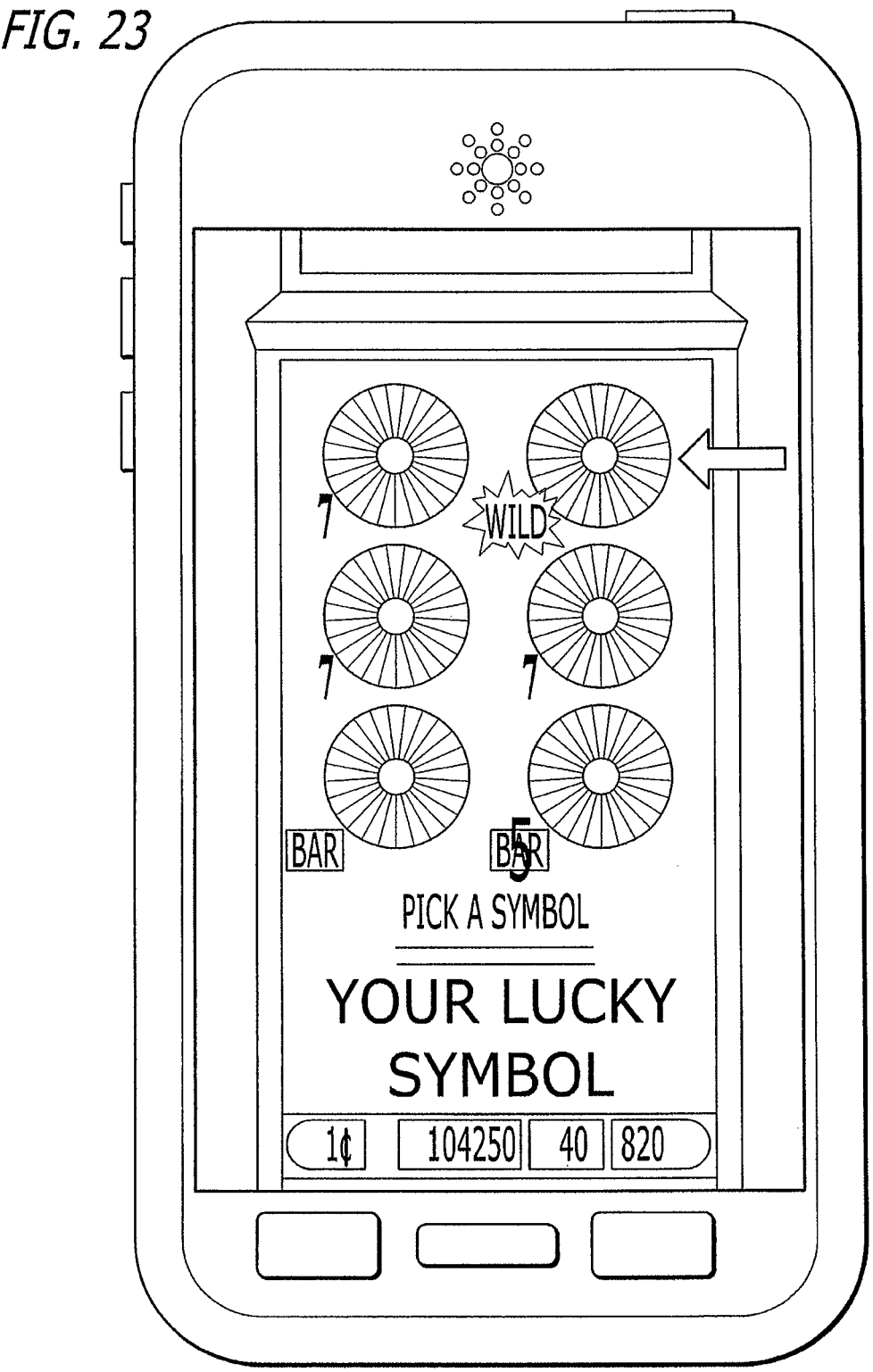
FIG. 23 illustrates a smart phone that is displaying a game application menu of an example strategy overlay.

Referring now to FIG. 23, an example of potential context-sensitive help being overlaid at the correct position on the camera image is shown. In such an embodiment of the gaming system having augmented reality gaming capabilities 1100, a player is assigned a "lucky" symbol for a feature. In some embodiments, the determination of this symbol is based upon past performance by the player of this game, past performance of the machine, a hashing algorithm based upon the player's name or telephone number, or combinations thereof. Continuing, when the player reaches the selection stage of the feature, the player uses the augmented reality application on his smart phone to take a photo or video and receive the image overlay, as shown in FIG. 23.

Referring now to FIG. 15, an embodiment of a gaming system having augmented reality gaming capabilities 1100 is shown that includes "data marks" in the captured image. These "data marks" may be displayed at similar locations to calibration marks, or ideally as in FIG. 15, they may be embedded within a suitable graphic. In the embodiment shown in FIG. 15, the data marks are the Dragon's eyes. In one aspect of a disclosed embodiment, a data mark performs by temporally varying the intensity of the pixel(s) that compose it. From the player's perspective, this varying of intensity appears as though the dragon's eyes are flickering. In contrast, an actual flicker typically requires an encoded stream of data. A simple implementation uses a high intensity pixel to indicate a binary 1, and a low intensity pixel to indicate a binary 0. In some embodiments, multiple data marks are used to increase data throughput.

By using calibration marks, the overall geometry of the game LCD is known with respect to the camera image. From this geometry, the expected position of the data marks may be derived. In some embodiments, the data marks are utilized as a one-way method of the game communicating with the augmented reality gaming application. In this manner, the data marks may be used for the following purposes: (1) The state of the game may be efficiently communicated (e.g., during free spins, the data marks may cause the phone to augment the display with extra graphical FX). (2) The game may provide "secret hints" to the player via their mobile phone with regard to choices to make during a game. Such features may be constructed such that the hints do not affect the overall hold over time, or simply decrease the hold by a known amount. In one embodiment, players may be targeted who have a consistent record of betting larger. (3) Game play statistics may be encrypted and sent via the data mark and augmented reality gaming application to a secure web service. These statistics may be collected by the manufacturer as an alternative means of collecting marketing data. Notably, in most embodiments, the phone application does not affect the outcome or operation of the underlying game since the communication is only one way.

In another embodiment of the gaming system having augmented reality gaming capabilities 1100, particular data marks provide a means for a gaming machine manufacturer to potentially track the deployment of games. Historically, there have been problems in some markets of games and machines being resold without the manufacturer's consent. This may potentially result in copy-protection methods being breached. Through the implementation of the disclosed gaming system, a manufacturer may make use of the location awareness of a modern smart phone, which then transmits the location of the phone along with data from the data mark, which is capable of uniquely identifying the gaming machine. If the location of the gaming machine is found to be incorrect based upon sales records, corrective action may be taken.

Figure 13:
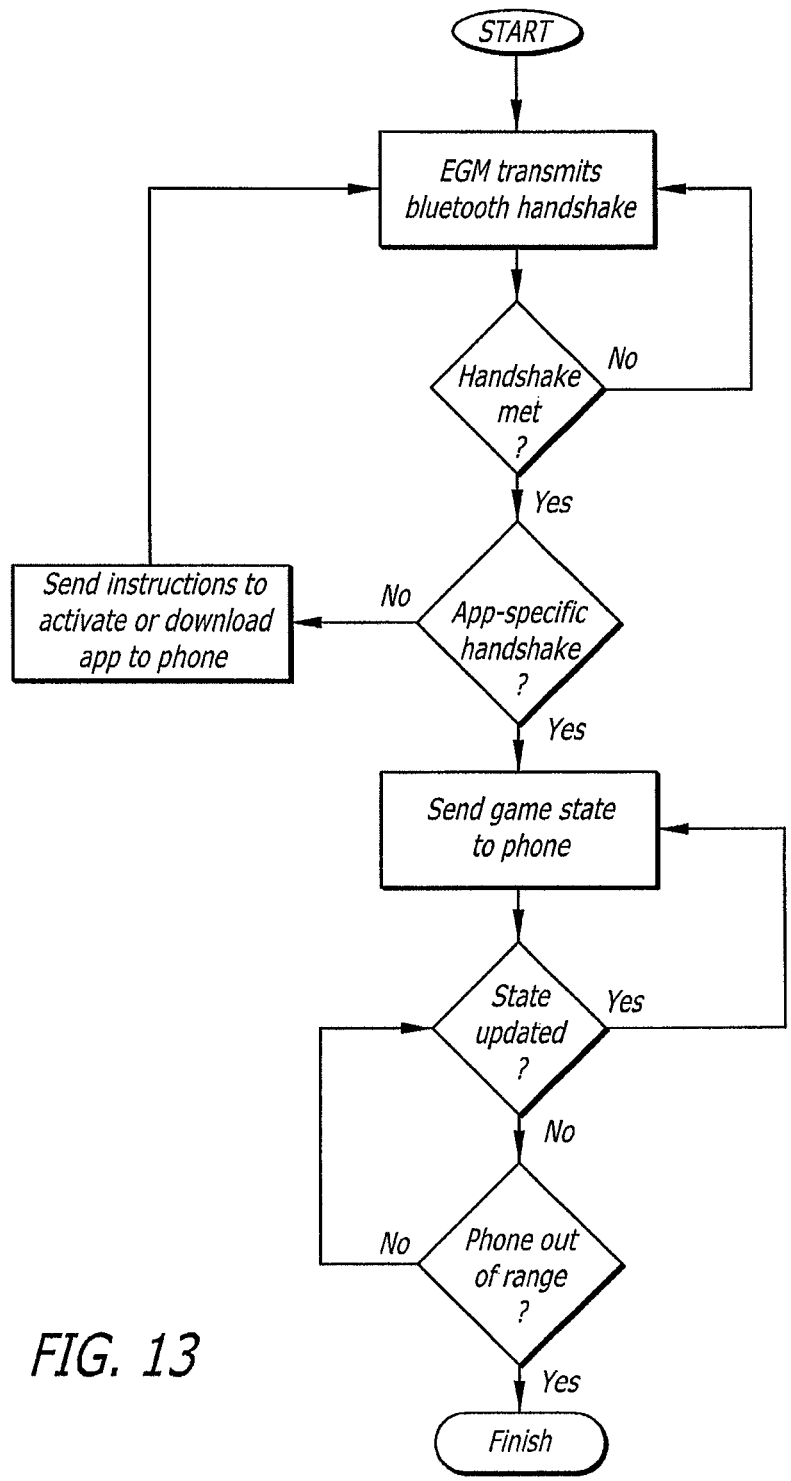
FIG. 13 illustrates a logic flow diagram of a process to begin an augmented session via bluetooth.

As noted above, there are a number of methods for establishing an augmented reality gaming session using an embodiment of the disclosed gaming system. As shown in FIG. 13, Bluetooth wireless technology may be used, by installing a Bluetooth radio in the gaming machine and leveraging the existing Bluetooth capabilities of a standard smart phone. In this manner, the selected gaming machine continually broadcasts to suitable Bluetooth devices using known Bluetooth discovery processes. When a handshake is made, the gaming machine determines if the handshake is from the augmented reality gaming application or from another source. If the handshake is from another source, the gaming machine sends a Bluetooth text message giving instructions on how to download the augmented reality gaming application.

Figure 18:
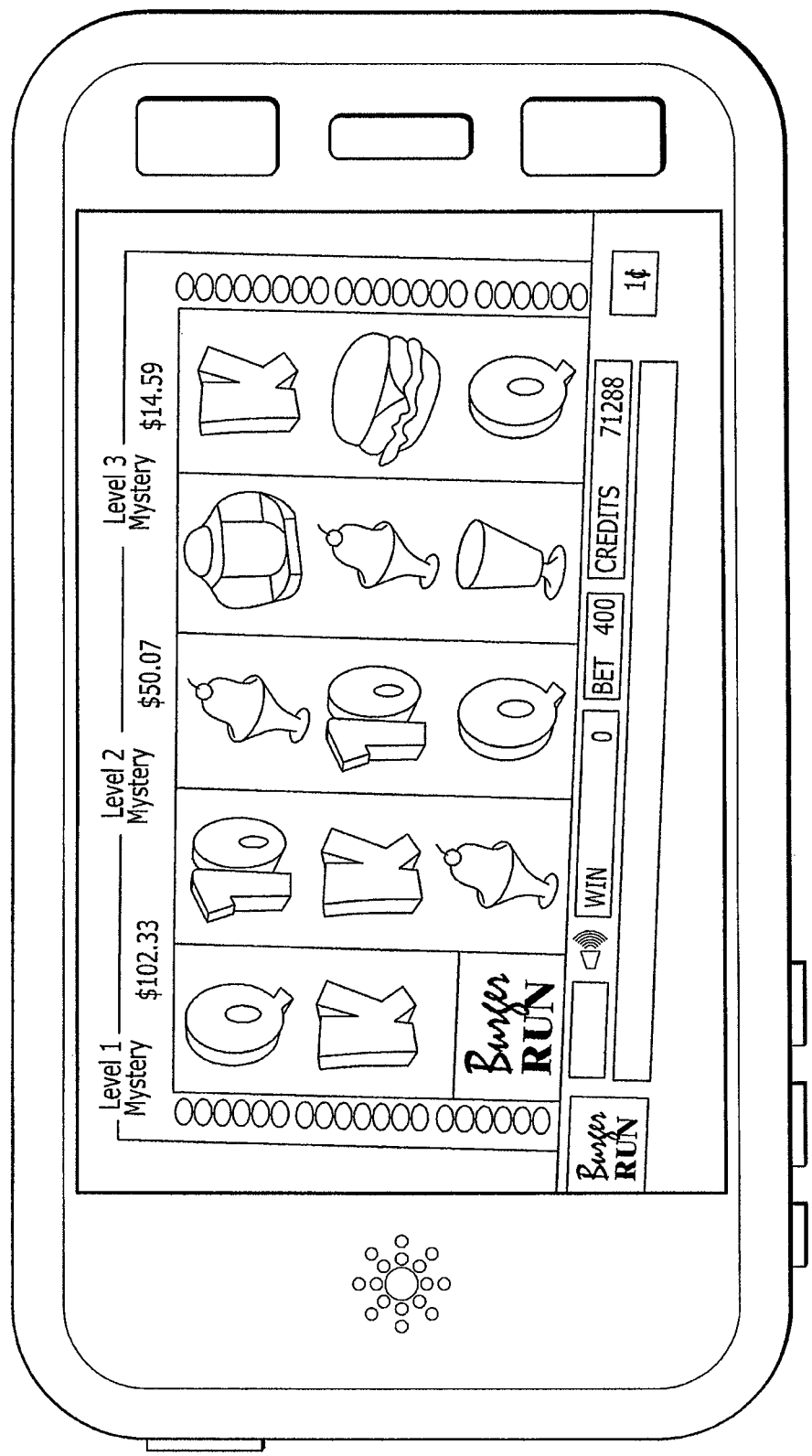
FIG. 18 illustrates an example image capture by the game application of "Burger Run."
Figure 19:
FIG. 19 illustrates a smart phone that is displaying a game application menu for "Burger Run."

Referring now to FIG. 18, once the gaming system is in communication with the augmented reality gaming application, the game information and state is sent to the application. This enables the augmented reality gaming application to display a menu such as shown in FIG. 19. In some embodiments, updated state information may be continually sent by Bluetooth rather than by the use of data marks or OCR throughout the session. This configuration provides the advantage of using Bluetooth. However, this benefit must be balanced against the potential downside of the communication being theoretically two-way, and thus, harder to be approved by certain gaming regulators.

Figure 14:
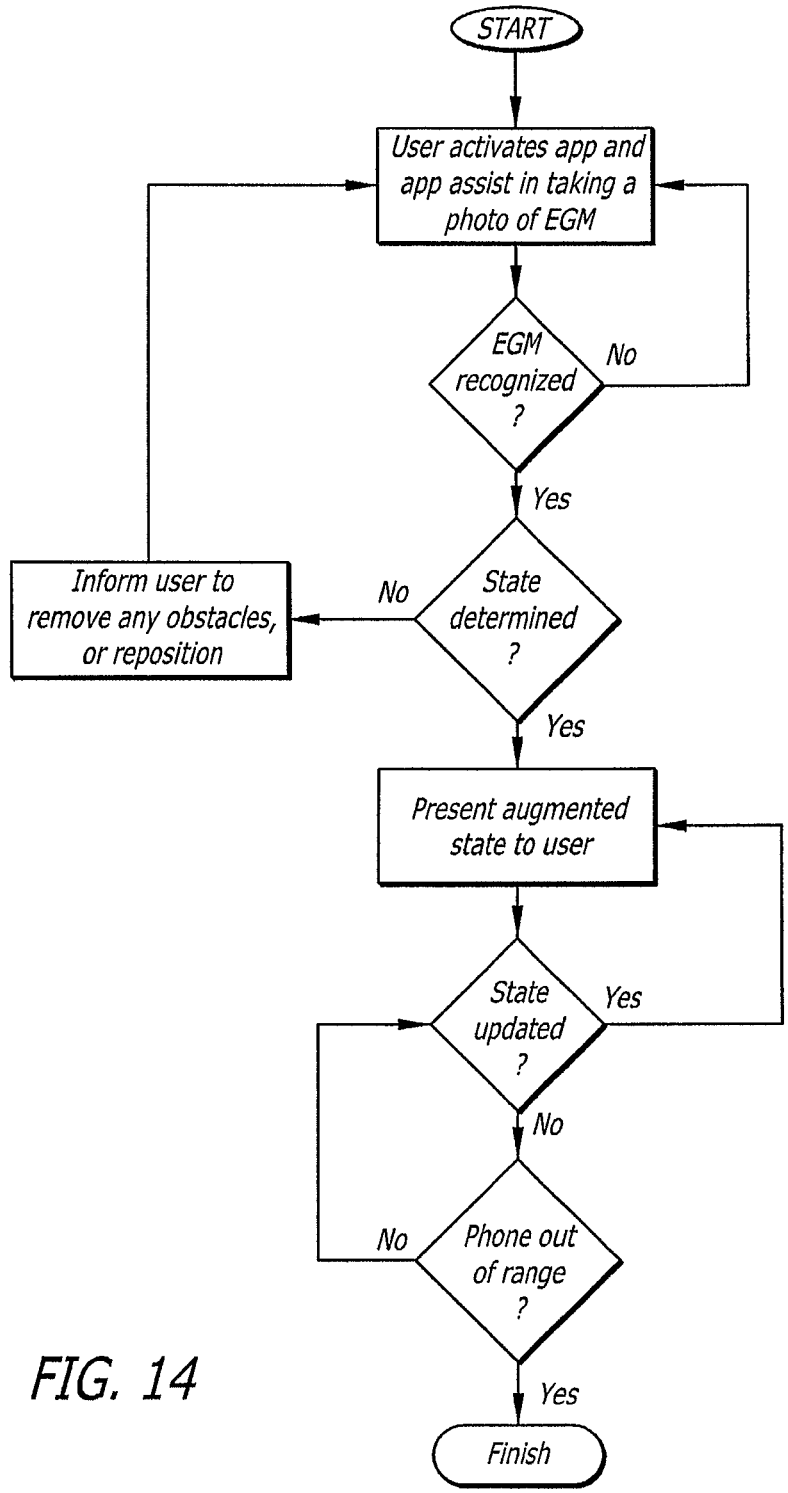
FIG. 14 illustrates a logic flow diagram of a process to begin an augmented session via image recognition.

As described in FIG. 14, an alternative to Bluetooth may be implemented using object recognition from a camera image. Specifically, in such an embodiment, the augmented reality gaming application which is loaded onto the player's smart phone, asks the user to take a photo of the gaming machine. Through the use of known object-recognition algorithms, the name of the game may be extracted. Further information may also be obtained by OCR analysis of the camera image. Specifically, the arrangement of symbols and the values of meters and other states are extracted from the camera image. Moreover, for marketing purposes, this data may be sent by the backend server or by the augmented reality gaming application via an SSL (secure socket layer) session to a secure manufacturer's web service.

Continuing in this embodiment, once the state of the game is known, an augmented state may be presented to the player via the display screen of the smart phone. For example, in some embodiments where a player is given the choice of three boxes to open, an arrow may appear on the mobile phone display pointing to the box that the player should favor. An example of an image capture from the process of FIG. 14 is shown in FIG. 18. In this embodiment, a player is playing a game called "Burger Run." Referring now to FIG. 19, a successful determination of the state results is shown in the content of the smart phone's display screen.

In this embodiment, the smart phone's display screen presents a number of features to the player, including, by way of example only, Game Rules, Games Like This, Progressive Info, Secret Strategy, and Download App. The "Game Rules" feature includes a standard pay table, videos demonstrating the features present in the game, and other general information. Selecting the "Games Like This" feature presents a list of games that were similar to a previously-played game, based upon denomination, volatility, and/or other factors. The "Progressive Info" feature is described in further detail below. In some embodiments, the "Secret Strategy" feature refers a player to one or more social networking sites where players may debate and propose strategies for the current game. The "Secret Strategy" feature may also provide context-sensitive help that is overlaid at the correct position on the camera image as described above in FIG. 23, to give the player the feeling that he may have an edge on the game. The "Secret Strategy" feature may also present time-limited bonuses that are currently available at this gaming machine (e.g., Power Winners promotions that are currently near the location of the smart phone).

In another aspect of some embodiments, the "Download App" feature enables a player to download a "fun" version (i.e., non-gambling version) of the game onto their phone. Otherwise stated, in such an embodiment, the gaming system having augmented reality gaming capabilities 1100 enables players to simply take a photo of games they wish to have on their smart phone, and have them automatically downloaded for continued future use.

Figure 20:
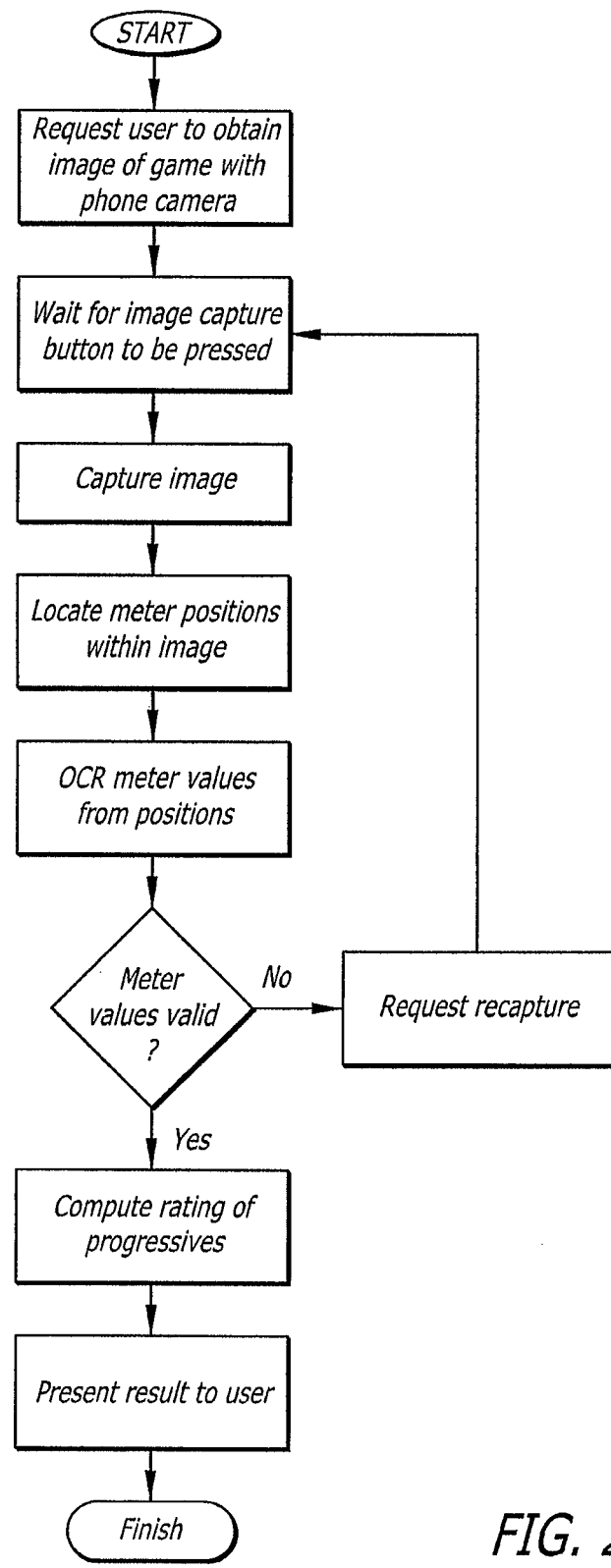
FIG. 20 illustrates a logic flow diagram of a process to present progressive ratings.
Figure 21:
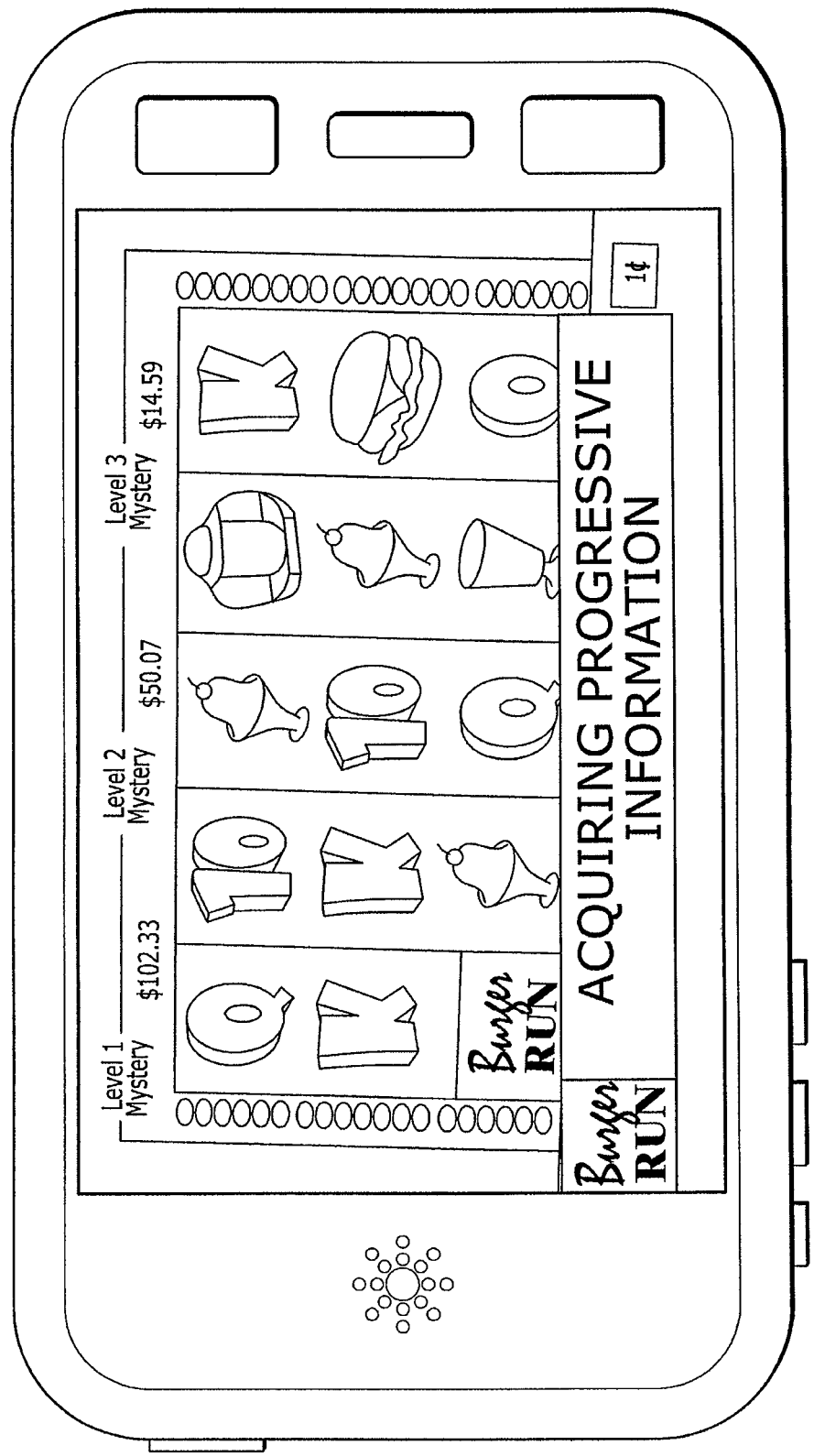
FIG. 21 illustrates a smart phone that is displaying a game application menu for progressive value decoding.
Figure 22:
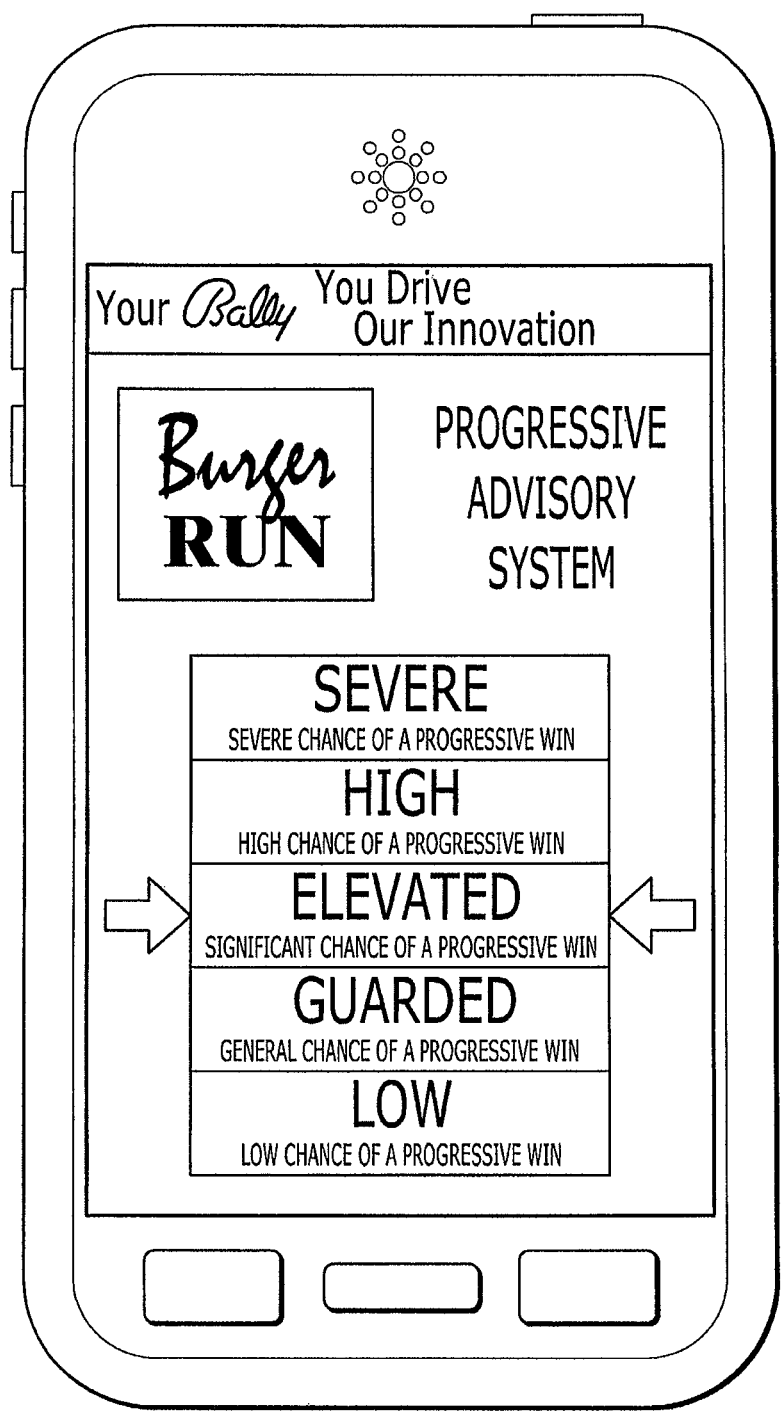
FIG. 22 illustrates a smart phone that is displaying a game application menu of an example progressive analysis presentation.

Referring again to the "Progressive Info" feature, this feature is further illustrated in FIGS. 20-22. Specifically, FIG. 20 illustrates a logic flow diagram of a process to present progressive rating. In one embodiment, FIG. 21 illustrates a smart phone in the process of acquiring progressive information for progressive value decoding. As with video poker, the gaming system having augmented reality gaming capabilities 1100 enables a player to take a photo of a progressive game. Continuing, as shown in FIG. 22, the mobile phone application or the backend server analyzes the current state of the meters to determine the current favorability of playing the game. This analysis is done by using the known meter positions within the captured LCD image (which may be derived by looking up the meter positions for a particular game once the game title itself has been derived using the processes in FIG. 13 or FIG. 14).

In some embodiments, the images at the meter positions are passed to an OCR (Optical Character Recognition) algorithm to determine the current progressive values. These values are then checked for sanity (i.e., if the values read are out-of-range for what may be expected, there may likely by either a problem with the image capture or with the installed progressive game). The values are then compared against their associated range, and a rating is determined. Otherwise stated, a progressive may have a range with a maximum expected value of $100, and a minimum of $90. If the current value read is $99.50, one would expect this progressive to be likely triggered comparatively soon. This result would also cause a high rating to be given.

In another embodiment of the gaming system having augmented reality gaming capabilities 1100, if the progressive is open-ended and does not have a maximum value, then the rating may be determined based upon the theoretical hold of the game based upon its current progressive states. In this manner, higher progressive values lead to a higher theoretical hold. In the case of multiple progressives, each rating may be shown individually, or combined into either an average or maximum rating. A maximum rating shows the rating of only the likeliest progressive to hit. Once determined, the rating is shown to the player, an example of which is shown in FIG. 22. In such an embodiment, progressive games are given a rating equivalent to the widely known Homeland Security warning system. Like its security counterpart, the rating may be configured such that the "low" rating is never chosen.

Notably, the use of calibration marks or a Bluetooth for determining the gaming machine screen position and orientation in a captured image is not necessary. In some embodiments of the gaming system having augmented reality gaming capabilities 1100, the game title may be determined by OCR or object recognition. In this manner, the fixed geometry and small set of possible images in a game may be used to quickly and accurately determine which game is present. Once the game title is determined, the known structure of the game display may be used in place of calibration marks. For example, in one embodiment, the game shown in FIG. 15 has touch screen buttons in the lower corners marked "Cash Out" and "Spin," which may be detected by object recognition and used as fixed points in the same way that the calibration marks would be used. Finally, in still another embodiment, techniques disclosed with respect to augmented reality gaming may be used as a way of augmenting a conventional stepper based game in the way that LCD overlays have been used. In this manner, a complex winning line arrangement may be shown on the mobile phone screen.

Some preferred implementations of the disclosed embodiments use (1) a smart phone for the client, (2) any suitable web server for communication with the smart phone and for the registration of players, and (3) OpenCV image analysis software. Additionally, some embodiments provide features that include, by way of example only: (1) new bonus concepts, (2) quick, intuitive processes for players to obtain help, downloadable games, or other enhancements, (3) scale-ability from no interaction with the game to full interaction with the game, (4) delivering content to augment a regulated game with a comparatively unregulated mobile phone application, which cannot affect the regulated game, (5) leveraging existing technology, and (6) requiring no new infrastructure. In other aspects, some embodiments provide: (1) the use of object recognition and OCR to deliver augmented content overlay of an existing game, (2) the ability to overlay content based upon one-way communication from gaming machine (data marks), and (3) a unique method of tracking potential license violations by casino users.

Figure 26:
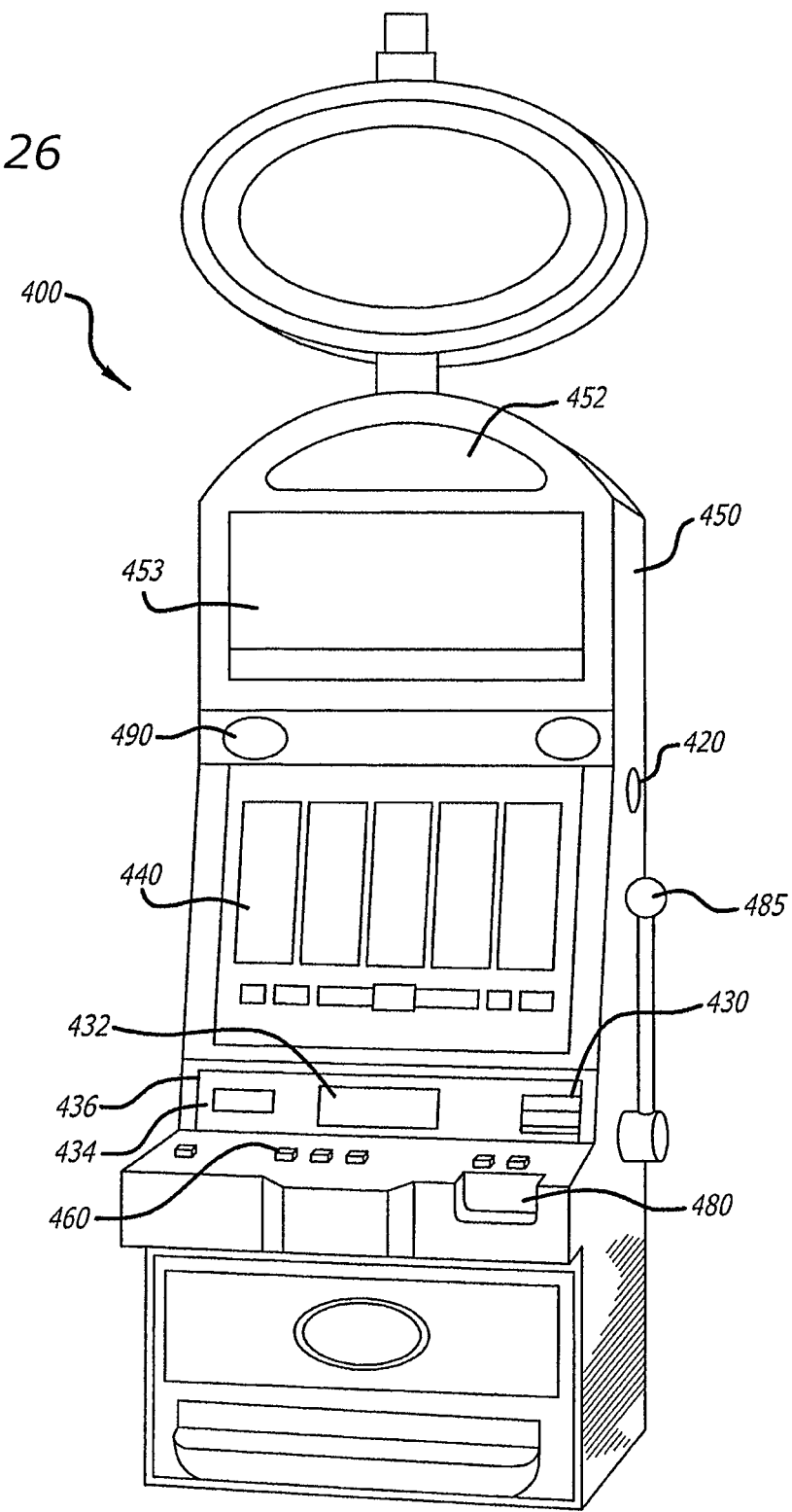
FIG. 26 is a perspective view of a gaming machine in accordance with one or more embodiments.
Figure 27:
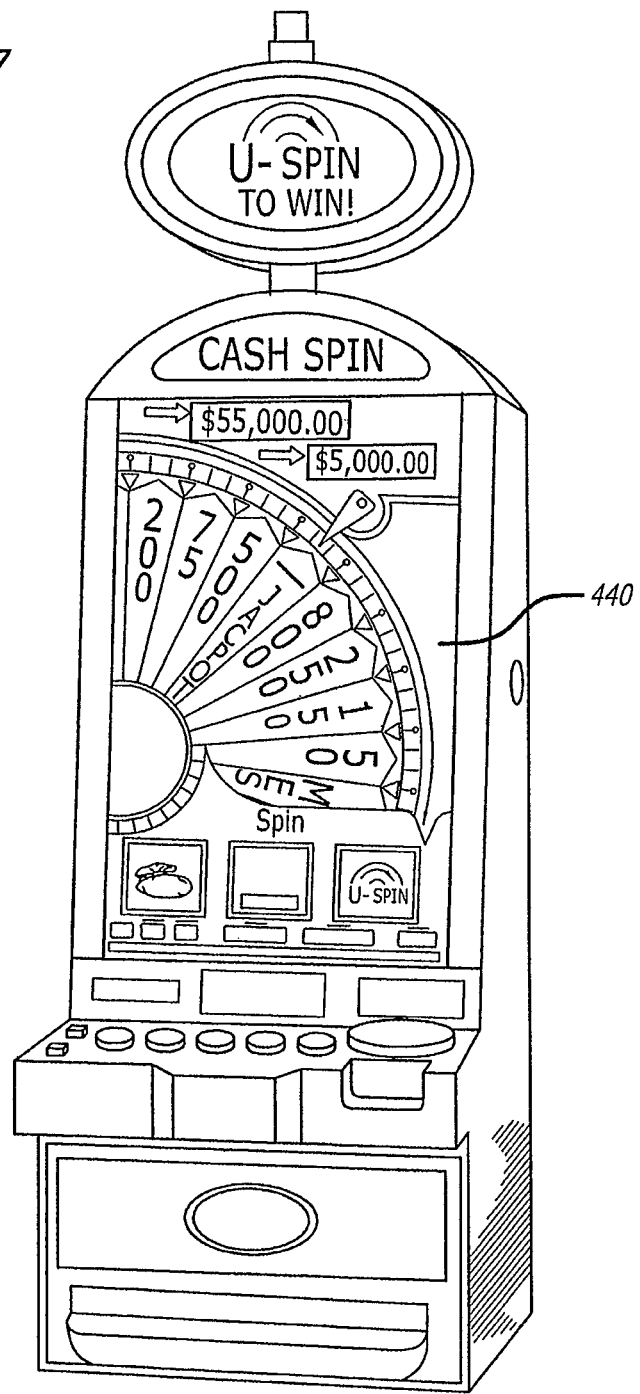
FIG. 27 is a perspective view of another embodiment of a gaming machine.

In accordance with one or more embodiments, FIGS. 26 and 27 illustrate a gaming machine 400 including cabinet housing 420, primary game display 440 upon which a primary game and feature game may be displayed, top box 450 which may display multiple progressives that may be won during play of the primary or feature game, player-activated buttons 460, player tracking panel 436, bill/voucher acceptor 480, and one or more speakers 490. Cabinet housing 420 is a self-standing unit that is generally rectangular in shape and may be manufactured with reinforced steel or other rigid materials which are resistant to tampering and vandalism. Cabinet housing 420 houses a processor, circuitry, and software (not shown) for receiving signals from the player-activated buttons 460, operating the games, and transmitting signals to the respective displays and speakers. Any shaped cabinet may be implemented with any embodiment of gaming machine 400 so long as it provides access to a player for playing a game. For example, cabinet 420 may comprise a slant-top, bar-top, or table-top style cabinet. The operation of gaming machine 400 is described more fully below.

In another aspect of one embodiment, the plurality of player-activated buttons 460 may be used for various functions such as, but not limited to, selecting a wager denomination, selecting a game to be played, selecting a wager amount per game, initiating a game, or cashing out money from gaming machine 400. The Buttons 460 functions to input mechanisms and may include mechanical buttons, electromechanical buttons or touch screen buttons. Optionally, a handle 485 may be rotated by a player to initiate a game.

In other embodiments, buttons 460 may be replaced with various other input mechanisms known in the art such as, but not limited to, a touch screen system, touch pad, track ball, mouse, switches, toggle switches, or other input means used to accept player input. For example, one input means is a universal button module as disclosed in U.S. application Ser. No. 11/106,212, entitled "Universal Button Module," filed on Apr. 14, 2005, which is hereby incorporated in its entirety by reference. Generally, the universal button module provides a dynamic button system adaptable for use with various games and capable of adjusting to gaming systems having frequent game changes. More particularly, the universal button module may be used in connection with playing a game on a gaming machine and may be used for such functions as selecting the number of credits to bet per hand. In other embodiments, a virtual button deck may be used to provide similar capabilities. An example of a virtual button deck is disclosed in U.S. application Ser. No. 11/938,203, entitled, "Game Related Systems, Methods, and Articles That Combine Virtual and Physical Elements," filed on Nov. 9, 2007, which is hereby incorporated in its entirety by reference.

Cabinet housing 420 may optionally include top box 450 which contains "top glass" 452 comprising advertising or payout information related to the game or games available on gaming machine 400. Player tracking panel 436 includes player tracking card reader 434 and player tracking display 432. Voucher printer 430 may be integrated into player tracking panel 436 or installed elsewhere in cabinet housing 420 or top box 450.

Game display 440 presents a game of chance wherein a player receives one or more outcomes from a set of potential outcomes. For example, one such game of chance is a video slot machine game. In other aspects of the embodiment, gaming machine 400 may present a video or mechanical reel slot machine, a video keno game, a lottery game, a bingo game, a Class II bingo game, a roulette game, a craps game, a blackjack game, a mechanical or video representation of a primary wheel game or the like.

Mechanical or video/mechanical embodiments may include game displays such as mechanical reels, wheels, or dice as required to present the game to the player. In video/mechanical or pure video embodiments, game display 440 is typically a CRT or a flat-panel display in the form of, but not limited to, liquid crystal, plasma, electroluminescent, vacuum fluorescent, field emission, or any other type of panel display known or developed in the art. Game display 440 may be mounted in either a "portrait" or "landscape" orientation and be of standard or "widescreen" dimensions (i.e., a ratio of one dimension to another of at least 16×9). For example, a widescreen display may be 32 inches wide by 18 inches tall. A widescreen display in a "portrait" orientation may be 32 inches tall by 18 inches wide. FIG. 27 illustrates an example of a portrait mode game display 440 having widescreen dimensions in accordance with one embodiment. Additionally, game display 440 preferably includes a touch screen or touch glass system (not shown) and presents player interfaces such as, but not limited to, credit meter (not shown), win meter (not shown) and touch screen buttons (not shown). An example of a touch glass system is disclosed in U.S. Pat. No. 6,942,571, entitled "Gaming Device with Direction and Speed Control of Mechanical Reels Using Touch Screen," which is hereby incorporated by reference. Furthermore, as described above, game display 440 may include transparent portions which cover and may interact with displays on mechanical reels, as described in U.S. application Ser. No. 12/113,112, entitled, "Mechanical Reels With Interactive Display," filed on Apr. 30, 2008, which is hereby incorporated in its entirety by reference.

Game display 440 may also present information such as, but not limited to, player information, advertisements and casino promotions, graphic displays, news and sports updates, or may even offer an alternate game. This information may be generated through a host computer networked with gaming machine 400 on its own initiative, or it may be obtained by request of the player using either (1) one or more of the plurality of player-activated buttons 460; (2) the game display itself, if game display 440 comprises a touch screen or similar technology; (3) buttons (not shown) mounted on game display 440 which may permit selections such as those found on an ATM machine, where legends on the screen are associated with respective selecting buttons; or (4) any player input device that offers the required functionality.

Cabinet housing 420 incorporates a single game display 440. However, in alternate embodiments, cabinet housing 420 or top box 450 may house one or more additional displays 453 or components used for various purposes including additional game play screens, animated "top glass," progressive meters or mechanical or electromechanical devices (not shown) such as, but not limited to, wheels, pointers or reels. The additional displays may or may not include a touch screen or touch glass system.

Figure 28A:
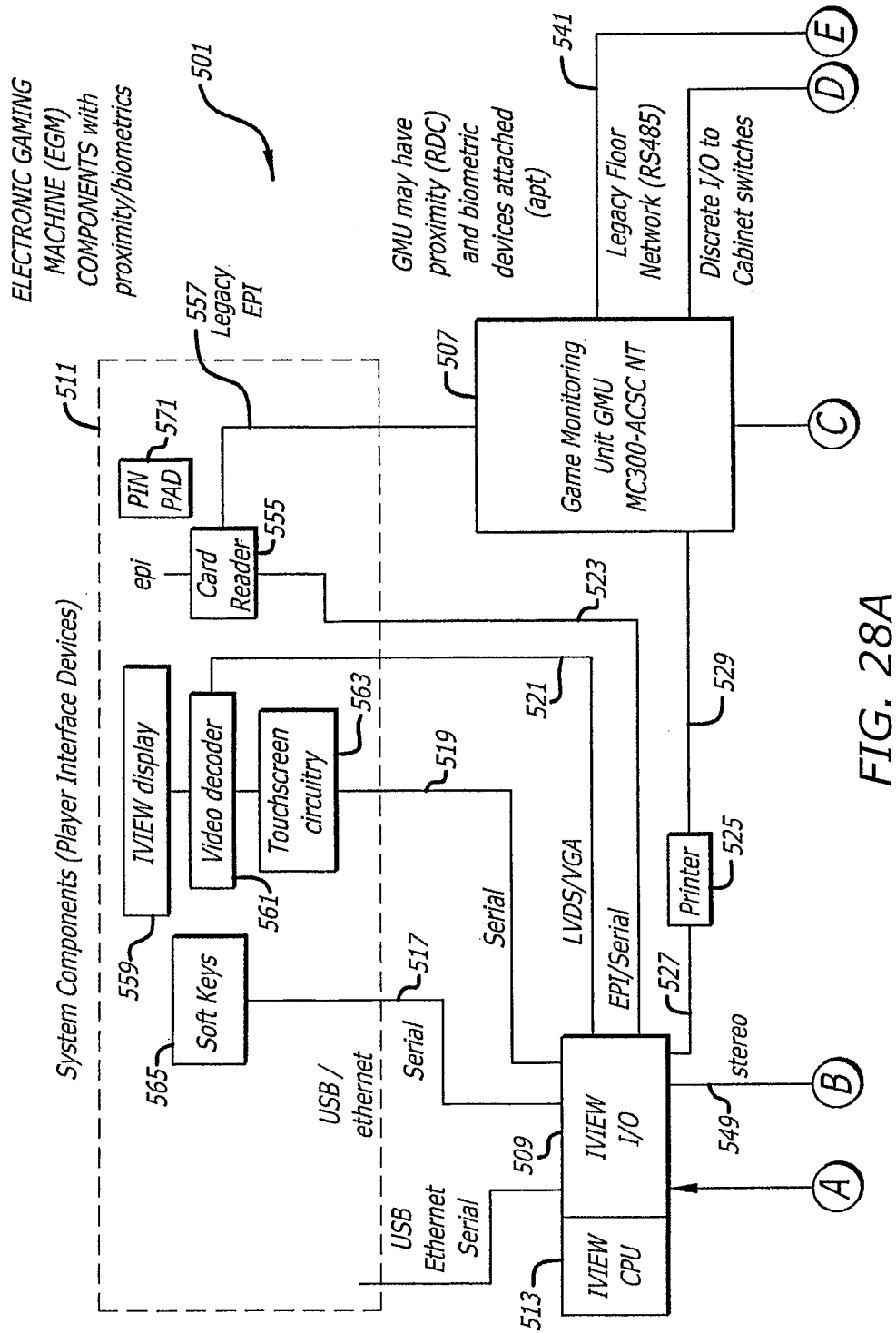
FIGS. 28A and 28B are block diagrams of the physical and logical components of the gaming machine of FIG. 26.
Figure 28B:
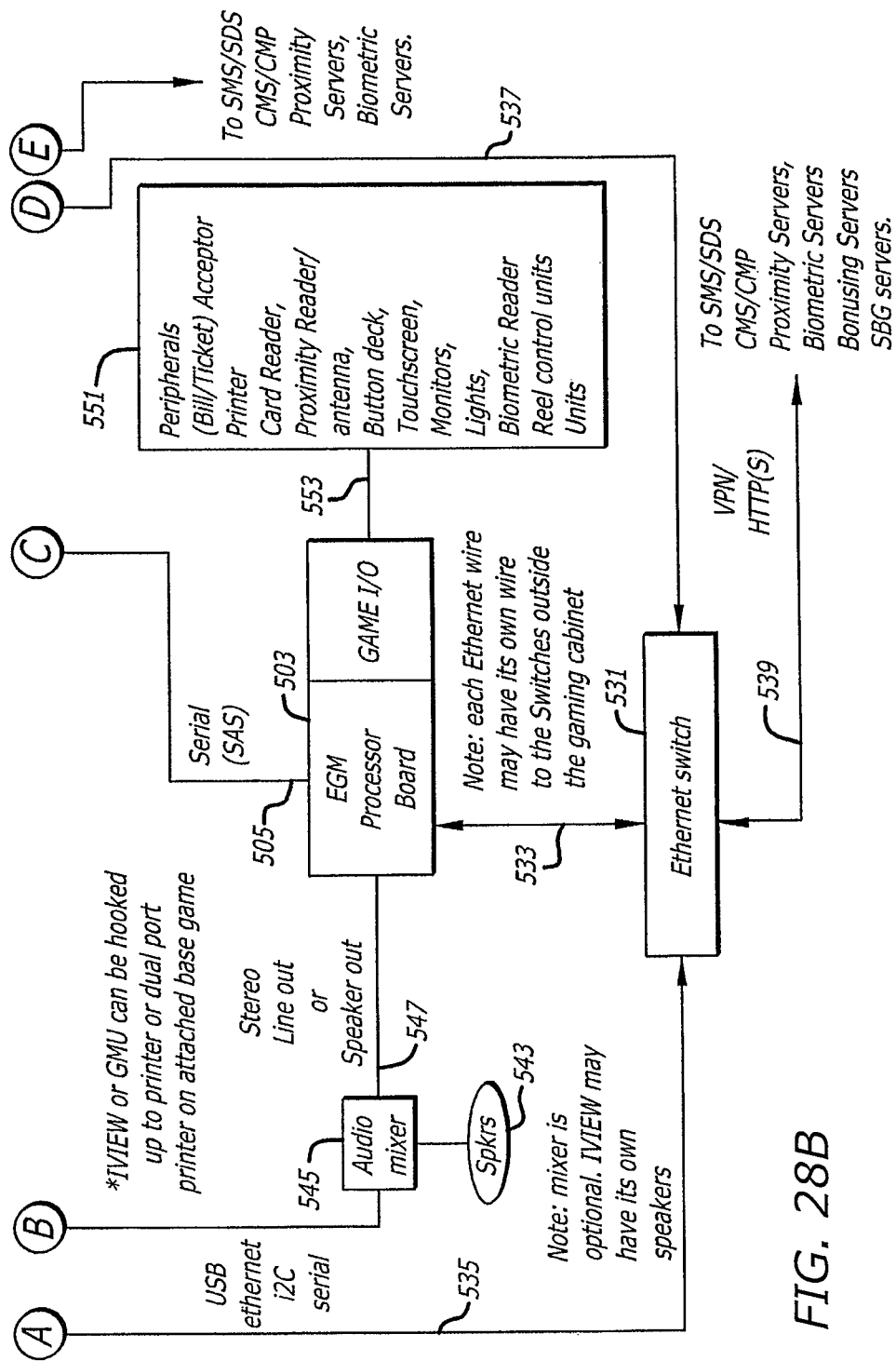

Referring to FIGS. 28A and 28B, electronic gaming machine 501 is shown in accordance with one or more embodiments. Electronic gaming machine 501 includes base game integrated circuit board 503 (EGM Processor Board) connected through serial bus line 505 to game monitoring unit (GMU) 507 (such as a Bally MC300 or ACSC NT), and player interface integrated circuit board (PIB) 509 connected to player interface devices 511 over bus lines 513, 515, 517, 519, 521, 523. Printer 525 is connected to PIB 509 and GMU 507 over bus lines 527, 529. EGM Processor Board 503, PIB 509, and GMU 507 connect to Ethernet switch 531 over bus lines 533, 535, 537. Ethernet switch 531 connects to a slot management system (SMS) and a casino management system (CMS) network over bus line 539. GMU 507 also may connect to the SMS and CMS network over bus line 541. Speakers 543 connect through audio mixer 545 and bus lines 547, 549 to EGM Processor Board 503 and PIB 509. The proximity and biometric devices and circuitry may be installed by upgrading a commercially available PIB 509, such as a Bally iVIEW unit. Coding executed on EGM Processor Board 503, PID 509, and/or GMU 507 may be upgraded to integrate a game having an interactive wheel game as is more fully described herein.

Peripherals 551 connect through bus 553 to EGM Processor Board 503. For example, a bill/ticket acceptor is typically connected to a game input-output board 553 which is, in turn, connected to a conventional central processing unit ("CPU") board 503, such as an Intel Pentium microprocessor mounted on a gaming motherboard. I/O board 553 may be connected to CPU processor board 503 by a serial connection such as RS-232 or USB or may be attached to the processor by a bus such as, but not limited to, an ISA bus. The gaming motherboard may be mounted with other conventional components, such as are found on conventional personal computer motherboards, and loaded with a game program which may include a gaming machine operating system (OS), such as a Bally Alpha OS. Processor board 503 executes a game program that causes processor board 503 to play a game. In one embodiment, the game program provides a slot machine game having an interactive wheel feature game. The various components and included devices may be installed with conventionally and/or commercially available components, devices, and circuitry into a conventionally and/or commercially available gaming machine cabinet, examples of which are described above.

When a player has inserted a form of currency such as, for example and without limitation, paper currency, coins or tokens, cashless tickets or vouchers, electronic funds transfers or the like into the currency acceptor, a signal is sent by way of I/O board 553 to processor board 503 which, in turn, assigns an appropriate number of credits for play in accordance with the game program. The player may further control the operation of the gaming machine by way of other peripherals 551, for example, to select the amount to wager via electromechanical or touch screen buttons. The game starts in response to the player operating a start mechanism such as a handle or touch screen icon.

The game program includes a random number generator to provide a display of randomly selected indicia on one or more displays. In some embodiments, the random number generator may be physically separate from gaming machine 400. For example, it may be part of a central determination host system which provides random game outcomes to the game program. Thereafter, the player may or may not interact with the game through electromechanical or touch screen buttons to change the displayed indicia. Finally, processor board 503 under control of the game program and OS compares the final display of indicia to a pay table. The set of possible game outcomes may include a subset of outcomes related to the triggering of a feature game. In the event the displayed outcome is a member of this subset, processor board 503, under control of the game program and by way of I/O Board 553, may cause feature game play to be presented on a feature display.

Predetermined payout amounts for certain outcomes, including feature game outcomes, are stored as part of the game program. Such payout amounts are, in response to instructions from processor board 503, provided to the player in the form of coins, credits or currency via I/O board 553 and a pay mechanism, which may be one or more of a credit meter, a coin hopper, a voucher printer, an electronic funds transfer protocol or any other payout means known or developed in the art.

In various embodiments, the game program is stored in a memory device (not shown) connected to or mounted on the gaming motherboard. By way of example, but not by limitation, such memory devices include external memory devices, hard drives, CD-ROMs, DVDs, and flash memory cards. In an alternative embodiment, the game programs are stored in a remote storage device. In one embodiment, the remote storage device is housed in a remote server. The gaming machine may access the remote storage device via a network connection, including but not limited to, a local area network connection, a TCP/IP connection, a wireless connection, or any other means for operatively networking components together. Optionally, other data including graphics, sound files and other media data for use with the EGM are stored in the same or a separate memory device (not shown). Some or all of the game program and its associated data may be loaded from one memory device into another, for example, from flash memory to random access memory (RAM).

In one or more embodiments, peripherals may be connected to the system over Ethernet connections directly to the appropriate server or tied to the system controller inside the EGM using USB, serial or Ethernet connections. Each of the respective devices may have upgrades to their firmware utilizing these connections.

GMU 507 includes an integrated circuit board, a GMU processor, and memory including coding for network communications, such as the G2S (game-to-system) protocol from the Gaming Standards Association, Las Vegas, Nev., used for system communications over the network. As shown, GMU 507 may connect to card reader 555 through bus 557 and may thereby obtain player card information and transmit the information over the network through bus 541. Gaming activity information may be transferred by the EGM Processor Board 503 to GMU 507 where the information may be translated into a network protocol, such as S2S, for transmission to a server, such as a player tracking server, where information about a player's playing activity may be stored in a designated server database.

PID 509 includes an integrated circuit board, PID processor, and memory which includes an operating system, such as Windows CE, a player interface program which may be executable by the PID processor together with various input/output (I/O) drivers for respective devices which connect to PID 509, such as player interface devices 511, and which may further include various games or game components playable on PID 509 or playable on a connected network server and PID 509, which is operable as the player interface. PID 509 connects to card reader 555 through bus 523, display 559 through video decoder 561 and bus 521, such as an LVDS or VGA bus.

As part of its programming, the PID processor executes coding to drive display 559 and provides messages and information to a player. Touch screen circuitry interactively connects display 559 and video decoder 561 to PID 509, such that a player may input information and cause the information to be transmitted to PID 509 either on the player's initiative or responsive to a query by PID 509. Additionally, soft keys 565 connects through bus 517 to PID 509 and operates together with display 559 to provide information or queries to a player and receive responses or queries from the player. PID 509, in turn, communicates over the CMS/SMS network through Ethernet switch 531 and busses 535, 539 and with respective servers, such as a player tracking server.

Player interface devices 511 are linked into the virtual private network of the system components in gaming machine 501. The system components include the iVIEW processing board and game monitoring unit (GMU) processing board. These system components may connect over a network to the slot management system (such as a commercially-available Bally SDS/SMS) and/or casino management system (such as a commercially-available Bally CMP/CMS).

The GMU system component has a connection to the base game through a serial SAS connection and is connected to various servers using, for example, HTTPs over Ethernet. Through this connection, firmware, media, operating system software, or gaming machine configurations can be downloaded to the system components from the servers. This data is authenticated prior to installation on the system components.

The system components include the iVIEW processing board and game monitoring unit (GMU) processing board. The GMU and iVIEW can be combined into one like the commercially available Bally GTM iVIEW device. This device may have a video mixing technology to mix the EGM processor's video signals with the iVIEW display onto the top box monitor or any monitor on the gaming device.

Figure 29:
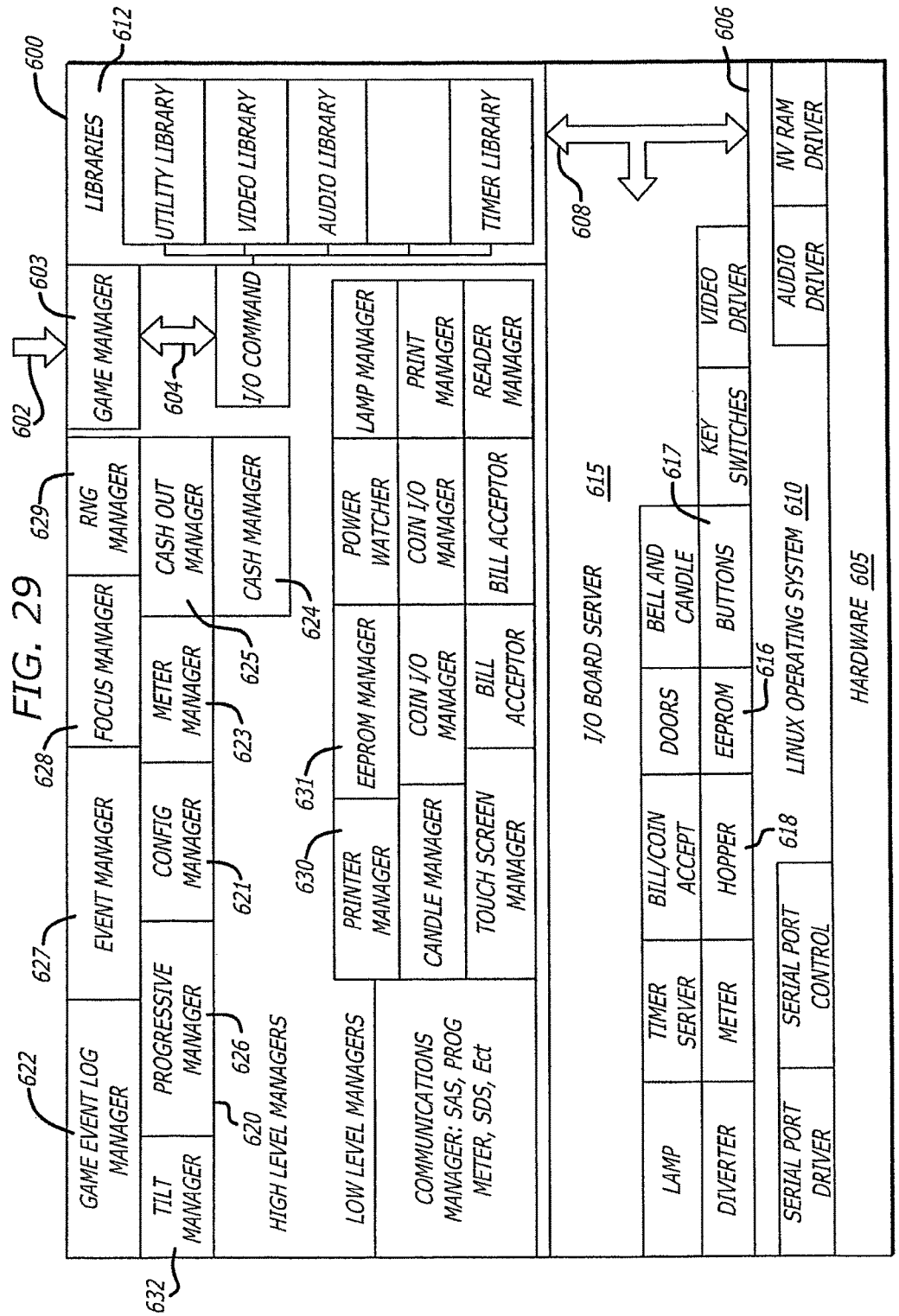
FIG. 29 is a block diagram of the logical components of a gaming kernel in accordance with one or more embodiments.

In accordance with one or more embodiments, FIG. 29 is a functional block diagram of a gaming kernel 600 of a game program under control of processor board 503, using gaming kernel 600 by calling it into application programming interface (API) 602, which is part of game manager 603. The components of game kernel 600, as shown in FIG. 29, are only illustrative and should not be considered limiting. For example, the number of managers may be changed, additional managers may be added or some managers may be removed without deviating from the scope and spirit of the disclosed system.

As shown in the example, there are three layers: a hardware layer 605; an operating system layer 610, such as, but not limited to, Linux; and a game kernel layer 600 having game manager 603 therein. In one or more embodiments, the use of a standard operating system 610, such a UNIX-based or Windows-based operating system, allows game developers interfacing to the gaming kernel to use any of a number of standard development tools and environments available for the operating systems. This is in contrast to the use of proprietary, low-level interfaces which may require significant time and engineering investments for each game upgrade, hardware upgrade, or feature upgrade. The game kernel layer 600 executes at the user level of the operating system 610, and itself contains a major component called the I/O Board Server 615. To properly set the bounds of game application software (making integrity checking easier), all game applications interact with gaming kernel 600 using a single API 602 in game manager 603. This enables game applications to make use of a well-defined, consistent interface, as well as making access points to gaming kernel 600 controlled, where overall access is controlled using separate processes.

For example, game manager 603 parses an incoming command stream and, when a command dealing with I/O comes in (arrow 604), the command is sent to an applicable library routine 612. Library routine 612 decides what it needs from a device, and sends commands to I/O Board Server 615 (see arrow 608). A few specific drivers remain in operating system 610's kernel, shown as those below line 606. These are built-in, primitive, or privileged drivers that are (i) general, (ii) kept to a minimum, and (iii) easier to leave than extract. In such cases, the low-level communications is handled within operating system 610, and the contents is passed to library routines 612.

Thus, in a few cases, library routines may interact with drivers inside operating system 610, which is why arrow 608 is shown as having three directions (between library utilities 612 and I/O Board Server 615, or between library utilities 612 and certain drivers in operating system 610). No matter which path is taken, the logic needed to work with each device is coded into modules in the user layer of the diagram. Operating system 610 is kept as simple, stripped down, and common across as many hardware platforms as possible. The library utilities and user-level drivers change as dictated by the game cabinet or game machine in which it will run. Thus, each game cabinet or game machine may have an industry standard processor board 505 connected to a unique, relatively dumb, and as inexpensive as possible I/O adapter board 540, plus a gaming kernel 600 which will have the game-machine-unique library routines and I/O Board Server 615 components needed to enable game applications to interact with the gaming machine cabinet. Note that these differences are invisible to the game application software with the exception of certain functional differences (i.e., if a gaming cabinet has stereo sound, the game application will be able to make use of API 602 to use the capability over that of a cabinet having traditional monaural sound).

Game manager 603 provides an interface into game kernel 600, providing consistent, predictable, and backwards-compatible calling methods, syntax, and capabilities by way of game application API 602. This enables the game developer to be free of dealing directly with the hardware, including the freedom to not have to deal with low-level drivers as well as the freedom to not have to program lower-level managers 630, although lower-level managers 630 may be accessible through game manager 603's interface 602 if a programmer has the need. In addition to the freedom derived from not having to deal with the hardware level drivers and the freedom of having consistent, callable, object-oriented interfaces to software managers of those components (drivers), game manager 603 provides access to a set of upper level managers 620 also having the advantages of consistent callable, object-oriented interfaces, and further providing the types and kinds of base functionality required in casino-type games. Game manager 603, providing all the advantages of its consistent and richly functional interface 602 as supported by the rest of game kernel 600, thus provides a game developer with a multitude of advantages.

Game manager 603 may have several objects within itself, including an initialization object (not shown). The initialization object performs the initialization of the entire game machine, including other objects, after game manager 603 has started its internal objects and servers in appropriate order. In order to carry out this function, the kernel's configuration manager 621 is among the first objects to be started. The configuration manager 621 has the data needed to initialize and correctly configure other objects or servers.

The upper level managers 620 of game kernel 600 may include game event log manager 622 which provides, at the least, a logging or logger base class, enabling other logging objects to be derived from this base object. The logger object is a generic logger. Otherwise stated, the logger object is not aware of the contents of logged messages and events. The log manager's (622) job is to log events in non-volatile event log space. The size of the space may be fixed, although the size of the logged event is typically not. When the event space or log space fills up, one embodiment deletes the oldest logged event (each logged event has a time/date stamp, as well as other needed information such as length), providing space to record the new event. In this embodiment, the most recent events are found in the log space, regardless of their relative importance. Further provided is the capability to read the stored logs for event review.

In accordance with one embodiment, meter manager 623 manages the various meters embodied in the game kernel 600. This includes the accounting information for the game machine and game play. There are hard meters (counters) and soft meters. The soft meters may be stored in non-volatile storage such as non-volatile battery-backed RAM to prevent loss. Further, a backup copy of the soft meters may be stored in a separate non-volatile storage such as EEPROM. In one embodiment, meter manager 623 receives its initialization data for the meters, during startup, from configuration manager 621. While running, the cash-in (624) and cash-out (625) managers call the meter manager's (623) update functions to update the meters. Meter manager 623 will, on occasion, create backup copies of the soft meters by storing the soft meters' readings in EEPROM. This is accomplished by calling and using EEPROM manager 631.

In accordance with still other embodiments, progressive manager 626 manages progressive games playable from the game machine. Event manager 627 is generic, like log manager 622, and is used to manage various gaming machine events. Focus manager 628 correlates which process has control of various focus items. Tilt manager 632 is an object that receives a list of errors (if any) from configuration manager 621 at initialization, and during game play from processes, managers, drivers, and the like, that may generate errors. A random number generator manager 629 is provided to allow easy programming access to a random number generator (RNG), as an (RNG) is required in virtually all casino-style (gambling) games. The RNG manager 629 includes the capability of using multiple seeds.

In accordance with one or more embodiments, a credit manager object (not shown) manages the current state of credits (cash value or cash equivalent) in the game machine, including any available winnings, and further provides denomination conversion services. Cash out manager 625 has the responsibility of configuring and managing monetary output devices. During initialization, cash out manager 625, using data from configuration manager 621, sets the cash-out devices correctly and selects any selectable cash-out denominations. During play, a game application may post a cash-out event through the event manager 627 (the same way all events are handled), and using a callback posted by cash-out manager 625, and cash-out manager 625 is informed of the event. Cash-out manager 625 updates the credit object, updates its state in non-volatile memory, and sends an appropriate control message to the device manager that corresponds to the dispensing device. As the device dispenses dispensable media, there typically are event messages being sent back and forth between the device and cash-out manager 625 until the dispensing finishes. After the dispensing finishes, the cash-out manager 625, having updated the credit manager and any other game state (such as some associated with meter manager 623) that needs to be updated for this set of actions, sends a cash out completion event to event manager 627 and to the game application thereby. The cash in manager 624 functions similarly to cash out manager 625, addressing requirements for controlling, interfacing, and managing actions associated with cashing in events, cash in devices, and associated meters and crediting.

In a further example, in accordance with one or more embodiments, I/O server 615 may write data to the gaming machine EEPROM memory, which is located in the gaming machine cabinet and holds meter storage that must be kept even in the event of power failure. Game manager 603 calls the I/O library functions to write data to the EEPROM. The I/O server 615 receives the request and starts a low priority EEPROM thread 616 within I/O server 615 to write the data. This thread uses a sequence of an 8-bit command, and data writes to the EEPROM device to write the appropriate data in the proper location within the device. Any errors detected are sent as IPC messages to game manager 603. Preferably, all of this processing is asynchronously performed.

In accordance with one embodiment, button module 617 within I/O server 615, polls (or is sent) the state of buttons every two milliseconds. These inputs are debounced by keeping a history of input samples. Certain sequences of samples are required to detect a button was pressed, in which case the I/O server 615 sends an inter-process communication event to game manager 603 that a button was pressed or released. In some embodiments, the gaming machine may have intelligently distributed I/O which debounces the buttons, in which case button module 617 may be able to communicate with the remote intelligent button processor to retrieve the button events and simply relay them to game manager 603 via IPC messages. In still another embodiment, the I/O library may be used for pay-out requests from the game application. For example, hopper module 618 must start the hopper motor, constantly monitoring the coin sensing lines of the hopper, debounce them, and send an IPC message to the game manager 603 when each coin is paid.

Further details, including disclosure of lower level fault handling and/or processing, are included in U.S. Pat. No. 7,351,151 entitled "Gaming Board Set and Gaming Kernel for Game Cabinets" and provisional U.S. patent application No. 60/313,743, entitled "Form Fitting Upgrade Board Set For Existing Game Cabinets," filed Aug. 20, 2001; said patent and provisional application are both fully incorporated herein by explicit reference.

Figure 30A:
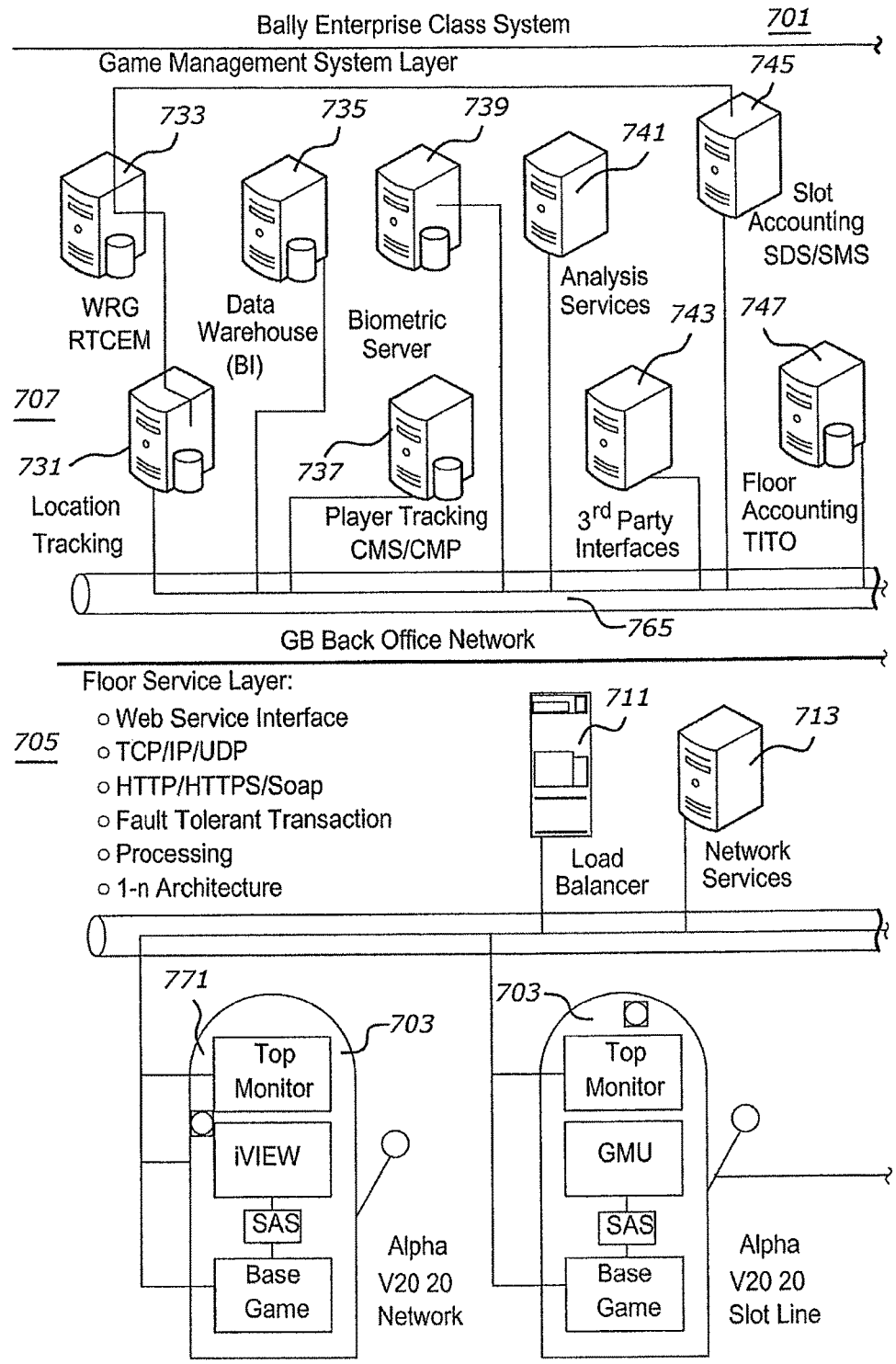
FIGS. 30A and 30B are schematic block diagrams showing the hardware elements of a networked gaming system in accordance with one or more embodiments.
Figure 30B:
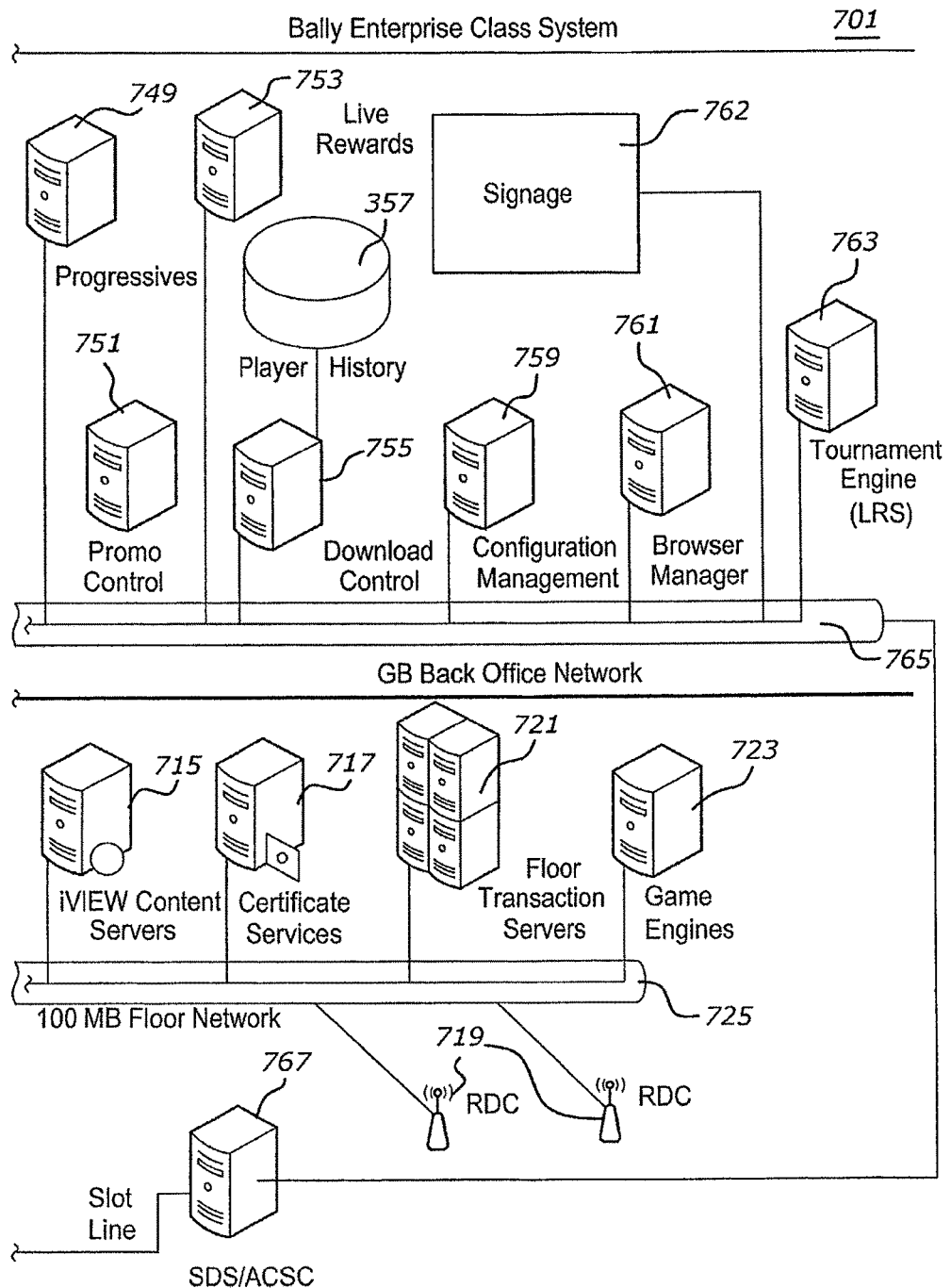

Referring to FIGS. 30A and 30B, enterprise gaming system 701 is shown in accordance with one or more embodiments. Enterprise gaming system 701 may include one casino or multiple locations and generally includes a network of gaming machines 703, floor management system (SMS) 705, and casino management system (CMS) 707. SMS 705 may include load balancer 711, network services servers 713, player interface (iVIEW) content servers 715, certificate services server 717, floor radio dispatch receiver/transmitters (RDC) 719, floor transaction servers 721 and game engines 723, each of which may connect over network bus 725 to gaming machines 703. CMS 707 may include location tracking server 731, WRG RTCEM server 733, data warehouse server 735, player tracking server 737, biometric server 739, analysis services server 741, third party interface server 743, slot accounting server 745, floor accounting server 747, progressives server 749, promo control server 751, bonus game (such as Bally Live Rewards) server 753, download control server 755, player history database 757, configuration management server 759, browser manager 761, tournament engine server 763 connecting through bus 765 to server host 767 and gaming machines 703.

The various servers and gaming machines 703 may connect to the network with various conventional network connections (such as, for example, USB, serial, parallel, RS485, and Ethernet). Additional servers which may be incorporated with CMS 707 include a responsible gaming limit server (not shown), advertisement server (not shown), and a control station server (not shown) where an operator or authorized personnel may select options and input new programming to adjust each of the respective servers and gaming machines 703. SMS 705 may also have additional servers including a control station (not shown) through which authorized personnel may select options, modify programming, and obtain reports of the connected servers and devices, and obtain reports. The various CMS and SMS servers are descriptively entitled to reflect the functional executable programming stored thereon and the nature of databases is maintained and utilized in performing their respective functions.

Gaming machines 703 include various peripheral components that may be connected with USB, serial, parallel, RS-485 or Ethernet devices/architectures to the system components within the respective gaming machine. The GMU has a connection to the base game through a serial SAS connection. The system components in the gaming cabinet may be connected to the servers using HTTPs or G2S over Ethernet. Using CMS 707 and/or SMS 305 servers and devices, firmware, media, operating systems, and configurations may be downloaded to the system components of respective gaming machines for upgrading or managing floor content and offerings in accordance with operator selections or automatically depending upon CMS 707 and SMS 705 master programming. The data and programming updates to gaming machines 703 are authenticated using conventional techniques prior to installation on the system components.

In various embodiments, any of the gaming machines 703 may be a mechanical reel spinning slot machine, video slot machine, video poker machine, video bingo machine, keno machine, or a gaming machine offering one or more of the above-described games including an interactive wheel feature. Alternately, gaming machines 703 may provide a game with an accumulation-style feature game as one of a set of multiple primary games selected for play by a random number generator, as described above. A gaming system of the type described above also allows a plurality of games in accordance with the various embodiments to be linked under the control of a group game server (not shown) for cooperative or competitive play in a particular area, carousel, casino or between casinos located in geographically separate areas. For example, one or more examples of group games under the control of a group game server are disclosed in U.S. application Ser. No. 11/938,079, entitled "Networked System and Method for Group Gaming," filed on Nov. 9, 2007, which is hereby incorporated by reference in its entirety for all purposes.

Various aspects of the systems, methods, functions, steps, features and the like corresponding thereto disclosed herein may be implemented on one or more computer systems using hardware, software, firmware, circuits, or combinations thereof. Hardware, software, firmware, and circuits respectively refer to any hardware, software, firmware, or circuit component. Computer systems referred to herein may refer to any computing device and vice versa (e.g., smart phone, mobile computing device, personal data assistant, tablet computer, laptop computer, desktop computer, gaming machine, other computing device, and the like). For example, each computer system or computing device in the systems described herein or any embodiment of a system disclosed herein may utilize one or more of the following components: a single-core or multi-core hardware processor (e.g., central processing unit or graphics processing unit) on which software instructions are executed (e.g., instructions corresponding to an operating system, an application program, an interpreter such as a virtual machine, or a compiler); a memory associated with and in connection with the hardware processor such as cache or other system memory that stores software instructions or other data that the hardware processor may access for processing; an input device (e.g., mouse, keyboard, touchscreen, and the like); an output device (e.g., display, touchscreen, printer, and the like); a network or communication interface that enables the computer system to communicate over a network or communication protocol; an application program having corresponding software instructions that are executable by a hardware processor. Connections between different computer systems and connections between different computer system components may be wired or wireless.

Virtualization computing techniques, cloud computing techniques, web application/website computing techniques, traditional and adaptive streaming techniques, and other computing techniques may be implemented by any embodiment of a system disclosed herein to enable and/or enhance the teachings described herein. For example, in a cloud computing embodiment, one or more servers (i.e., one or more computer systems) may store and execute software instructions corresponding to an application program based on input data received from client devices. In response to the input data received, the application program is executed accordingly, which results in graphical data being processed and output to the client devices for display on a display such as a touch screen on a smart phone or tablet computer.

As another example, in a web application or website embodiment, data representative of a user input may be transmitted to a server (i.e., a computer system) hosting the website for processing and storage in memory. In an application program embodiment, the application may be stored and executed locally on a user's computer system. In other embodiments, one or more components of the application program may be stored and executed on a server and the user's computer system. For example, a user may download the application program from an app store for an Android computing device, Blackberry computing device, Apple computing device, Windows computing device, Samsung computing device, other computing device, and the like. Execution of the application program on the user's computing device may require that the device transmit and receive data to and from one or more computing devices such as a server or other user's computing device. For example, an application may be downloaded from a server to a mobile device. Upon installation, the mobile device may communicate with a server, such as a gaming server.

One or more embodiments of the systems disclosed herein may utilize streaming technology. Streaming data enables data to be presented to the user of the client device while the client device receives data from the server. Streaming data from servers to client devices (e.g., computing devices operated by users) over a network is typically limited by the bandwidth of the network, or alternatively, the physical layer net bitrate. Traditional streaming protocols, such as RTSP (Real-Time Streaming Protocol), MS-WMSP (Windows Media HTTP Streaming Protocol), and RTMP (Real Time Messaging Protocol) may be implemented, which essentially send data in small packets from the server to the client device in real-time at the encoded bitrate of the data. Adaptive streaming may also be implemented. Adaptive streaming almost exclusively relies on HTTP for the transport protocol. Similar to traditional streaming, data is encoded into discrete packets of a particular size; however, the source data is encoded at multiple bitrates rather than a single bitrate. The data packets corresponding to the same data encoded at different bitrates are then indexed based on the bitrate in memory. This streaming method works by measuring, in real-time, the available bandwidth and computer capacity of the client device, and adjusts which indexed data packet to transfer based on the encoded bitrate.

One or more aspects of the systems disclosed herein may be located on (i.e., processed, stored, executed, or the like; or include one or more hardware or software components) a single computer system or may be distributed among a plurality of computer systems attached by one or more communication networks (e.g., interne, intranet, a telecommunications network, and the like). One or more components of a computer system may be distributed across one or more computer systems in communication with the computer system over a communication network. For example, in some embodiments, the systems disclosed herein may utilize one or more servers (i.e., one or more computer systems dedicated for a particular purpose in the system) that may be dedicated to serve the needs of one or more other computer systems or components across a communication network and/or system bus. The one or more servers may provide a central processing location for one or more aspects of the systems disclosed herein.

Again, various aspects of the systems, methods, function, and steps corresponding thereto disclosed herein may be implemented on one or more computer systems using hardware, software, firmware, or combinations thereof. Those of ordinary skill in the art will appreciate that one or more circuits and/or software may be used to implement the system and methods described herein. Circuits refer to any circuit, whether integrated or external to a processing unit such as a hardware processor. Software refers to code or instructions executable by a computing device using any hardware component such as a processor to achieve the desired result. This software may be stored locally on a processing unit or stored remotely and accessed over a communication network.

As disclosed herein, a processor or hardware processor may refer to any hardware processor or software processor. A software processor may include or otherwise constitute an interpreter that is executed by a hardware processor. A computer system according to any embodiment disclosed herein is configured to perform any of the described functions related to the various embodiments of the systems disclosed herein.

As disclosed herein, any method, function, step, feature, or result may be considered a module that may include software instructions that cause, when executed by a computing device, the desired method, function, step, feature, or result. Executed by a computing device includes execution by any hardware component (e.g., CPU, GPU, network interface, integrated circuits, other hardware components, and the like) of the computing device such as a hardware processor. Any module may be executed by a computing device (e.g., by a processor of the computing device). Any method, function, step, feature, result, and the like disclosed herein may be implemented by one or more software modules whether explicitly described or not. Individual components within a computing device may work together to accomplish a desired method, function, step, feature, or result. For example, a computing device may receive data and process the data. A simple example would be that a network interface receives the data and transmits the data over a bus to a processor.

Various aspects of the systems disclosed herein may be implemented as software executing in a computer system. The computer system may include a central processing unit (i.e., a hardware processor) connected to one or more memory devices, a graphical processing unit, input devices such as a mouse and keyboard, output devices such as speakers and a display, a network interface to connect to one or more other computer systems (e.g., one or more computer systems configured to provide a service such as function as a database), an operating system, a compiler, an interpreter (i.e., a virtual machine), and the like. The memory may be used to store executable programs and data during operation of the computer system. The executable programs may be written in a high-level computer programming language, such as Java or C++. Of course, other programming languages may be used since this disclosure is not limited to a specific programming language or computer system. Further, it is to be appreciated that the systems and methods disclosed herein are not limited to being executed on any particular computer system or group of computer systems.

Some methods, functions, steps, or features have been described as being executed by corresponding software by a processor. It is understood than any methods, functions, steps, features, or anything related to the systems disclosed herein may be implemented by hardware, software (e.g., firmware), or circuits despite certain methods, functions, steps, or features having been described herein with reference to software corresponding thereto that is executable by a processor to achieve the desired method, function, or step.

It is understood that software instructions may reside on a non-transitory medium such as one or more memories accessible to one or more processors in the systems disclosed herein. For example, where a computing device receives data, it is understood that the computing device processes that data whether processing the data is affirmatively stated or not. Processing the data may include storing the received data, analyzing the received data, and/or processing the data to achieve the desired result, function, method, or step. It is further understood that input data from one computing device or system may be considered output data from another computing device or system, and vice versa. It is yet further understood that any methods, functions, steps, features, results, or anything related to the systems disclosed herein may be represented by data that may be stored on one or more memories, processed by one or more computing devices, received by one or more computing devices, transmitted by one or more computing devices, and the like.

The various embodiments and examples described herein are provided by way of illustration only and should not be construed to limit the claimed invention, nor the scope of the various embodiments and examples. Those skilled in the art will readily recognize various modifications and changes that may be made to the claimed invention without following the example embodiments and applications illustrated and described herein, and without departing from the true spirit and scope of the claimed invention, which is set forth in the following claims. In addition, various embodiments may be combined. Therefore, reference to an embodiment, one embodiment, in some embodiments, in other embodiments, and the like does not preclude one or more methods, functions, steps, features, results, hardware implementations, or software implementations of different embodiments from being combined. Further, reference to an embodiment, one embodiment, in some embodiments, in other embodiments, examples, and the like provides various aspects that may or may not be combined with those of one or more different embodiments and/or examples.

While the example embodiments have been described with relation to a gaming environment, it will be appreciated that the above concepts can also be used in various non-gaming environments. For example, such rewards can be used in conjunction with purchasing products, e.g., gasoline or groceries, associated with vending machines, used with mobile devices or any other form of electronic communications. Accordingly, the disclosure should not be limited strictly to gaming casinos, arcades, portal based game sites, cellular phone devices, personal digital assistant devices, laptops, personal computers, home game consoles, bar top gaming devices, table gaming devices, surface computing devices, table gaming biometric touch screen, television gaming, or in-room gaming devices.

What is claimed is:

1. A method of displaying augmented reality information associated with a user-specific object using mobile device in an augmented reality system, the method comprising:
   acquiring user-specific identification information from the user-specific object;
   sending the user-specific identification information via a network to a server;
   retrieving user-specific specific information from the server using the mobile device; and
   displaying the user-specific specific information in conjunction with the user-specific object when viewing the user-specific object through the display of the mobile device using augmented reality, wherein a user virtually views information associated with the user-specific object using augmented reality graphical representations.

2. The method of claim 1, wherein user-specific information includes messages to the user, available credits, promotional points available to the user, or combinations thereof.

3. The method of claim 1, wherein the user-specific information is displayed using one or more icons presented in association with user-specific object when viewed through the display of the mobile device.

4. The method of claim 1, wherein acquiring user-specific identification information from the user-specific object using optical character recognition of information visible on the user-specific object.

5. The method of claim 1, further comprising enabling the user to interact with the user-specific information in conjunction with the user-specific object when viewing the user-specific object through the display of the mobile device using augmented reality.

6. The method of claim 1, wherein the user-specific information is promotional or voucher information.

7. The method of claim 6, wherein promotional or voucher information includes a complementary drink icon, movie ticket icon, restaurant voucher icon, or combinations thereof.

8. The method of claim 6, wherein the promotional or voucher information is displayed using one or more icons presented in association with user-specific object when viewed through the display of the mobile device.

9. The method of claim 6, wherein acquiring user-specific identification information from the user-specific object using optical character recognition of information visible on the user-specific object.

10. The method of claim 6, further comprising enabling the user to interact with the promotional or voucher information in conjunction with the user-specific object when viewing the user-specific object through the display of the mobile device using augmented reality.

11. The method of claim 1, wherein the user-specific information is bonus game information.

12. The method of claim 11, wherein bonus game information includes a virtual bonus game, virtual promotional game, virtual base game, or combinations thereof.

13. The method of claim 11, wherein the bonus game information is displayed using one or more icons presented in association with user-specific object when viewed through the display of the mobile device.

14. The method of claim 11, wherein acquiring user-specific identification information from the user-specific object using optical character recognition of information visible on the user-specific object.

15. The method of claim 11, further comprising enabling the user to interact with the promotional or voucher information in conjunction with the user-specific object when viewing the user-specific object through the display of the mobile device using augmented reality.

16. A method of displaying user-specific augmented reality features at a user's mobile device in association with a user-specific physical instrument, the method comprising:
   providing for acquisition of the user-specific identification information from the user-specific physical instrument;
   enabling the user-specific identification information to be sent to a server;

retrieving user-specific augmented reality features from the server using the user-specific identification information; and enabling a display at the mobile device to present the user-specific augmented reality features in conjunction with the user-specific physical instrument when viewing the user-specific physical instrument at the display of the mobile device, wherein the user-specific physical instrument is a user-specific object.

17. The method of claim 16, wherein the user-specific augmented reality features include user-specific available credit.

18. A system for displaying user-specific augmented reality features at a user's mobile device in association with a user-specific physical instrument, the system comprising:

a server storing data representing user-specific augmented reality features; and a software application to (i) configure the user's mobile device for acquiring the user-specific identification information when viewing a live image of the user-specific physical instrument using a mobile device camera and mobile device display and (ii) transmit the acquired user-specific identification information to the server;

the server arranged to (i) access the user-specific augmented reality features using the user-specific identification information and (ii) provide user-specific augmented reality features to the user's mobile device, wherein the user-specific augmented reality features include user-specific available credit, the software application configuring the mobile device to display the user-specific augmented reality features in conjunction with the user-specific physical instrument when viewing the user-specific physical instrument on the display of the mobile device.

19. The system of claim 18, wherein the user-specific physical instrument is a user-specific object.

* * * * *